(12) United States Patent
Pierson et al.

(10) Patent No.: US 12,081,144 B2
(45) Date of Patent: Sep. 3, 2024

(54) METHOD AND APPARATUS FOR PERIOD DETECTION-BASED CONTROL OF REGULATION CONTROL PARAMETER

(71) Applicant: Infineon Technologies Austria AG, Villach (AT)

(72) Inventors: Richard Pierson, Lakewood, CA (US); Venkat Sreenivas, Winchester, MA (US); Bikiran Goswami, Burlington, MA (US); David Lewis, Andover, MA (US)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 183 days.

(21) Appl. No.: 17/510,794

(22) Filed: Oct. 26, 2021

(65) Prior Publication Data
US 2023/0127837 A1   Apr. 27, 2023

(51) Int. Cl.
*H02M 1/00*   (2007.01)
*H02M 3/156*   (2006.01)
(Continued)

(52) U.S. Cl.
CPC ....... *H02M 7/5395* (2013.01); *H02M 1/0016* (2021.05); *H02M 1/0019* (2021.05);
(Continued)

(58) Field of Classification Search
CPC ............. H02M 1/0003; H02M 1/0009; H02M 1/0012; H02M 1/0019; H02M 1/0022;
(Continued)

(56) References Cited

U.S. PATENT DOCUMENTS 6,965,502 B2 *  11/2005  Duffy ..................... G06F 1/305
                                              361/111
9,065,339 B2    6/2015   Pierson et al.
(Continued)

FOREIGN PATENT DOCUMENTS

JP         2015219959 A       12/2015

OTHER PUBLICATIONS

European Patent Office; Extended European Search Report; 7 Pgs; Mar. 10, 2023.

*Primary Examiner* — Thienvu V Tran
*Assistant Examiner* — Shahzeb K Ahmad
(74) *Attorney, Agent, or Firm* — Cooper Legal Group LLC

(57)   ABSTRACT

An apparatus may include a regulated power converter, a control engine configured to control the regulated power converter based upon a regulation control parameter, a period detection system and a parameter control system. The period detection system may be configured to monitor a signal to detect transient events at an output of the regulated power converter, wherein the transient events include a first transient event and a second transient event after the first transient event. The period detection system may be configured to determine, in response to the second transient event, a transient event period between the first transient event and the second transient event. The period detection system may be configured to determine transient event period information based upon the transient event period. The parameter control system may be configured to set the regulation control parameter to a value determined based upon the transient event period information.

22 Claims, 14 Drawing Sheets

(51) Int. Cl.
*H02M 7/538* (2007.01)
*H02M 7/5395* (2006.01)
*H02M 7/64* (2006.01)

(52) U.S. Cl.
CPC ....... *H02M 1/0025* (2021.05); *H02M 3/1566* (2021.05); *H02M 7/53803* (2013.01); *H02M 7/64* (2013.01)

(58) Field of Classification Search
CPC ...... H02M 1/0025; H02M 1/08; H02M 1/082; H02M 1/15; H02M 1/32; H02M 3/156; H02M 3/158; H02M 3/1582; H02M 3/1584; H02M 3/1586
See application file for complete search history.

(56) References Cited

U.S. PATENT DOCUMENTS

| | | | |
|---|---|---|---|
| 10,324,480 | B2 | 6/2019 | You et al. |
| 11,658,576 | B2 * | 5/2023 | Cimaz ................. H02M 1/082 323/265 |
| 2006/0152205 | A1 * | 7/2006 | Tang .................... H02M 3/1584 323/284 |
| 2009/0121695 | A1 * | 5/2009 | Pierson ............... H02M 3/1584 323/283 |
| 2012/0126761 | A1 * | 5/2012 | Tuten .................... H02M 3/157 327/427 |
| 2013/0088803 | A1 | 4/2013 | Kim et al. |
| 2014/0125306 | A1 * | 5/2014 | Babazadeh ............... G05F 5/00 323/285 |
| 2015/0280584 | A1 * | 10/2015 | Gong ............... H02M 3/33592 363/21.13 |
| 2015/0364982 | A1 * | 12/2015 | Chae .................... H02M 3/157 323/299 |
| 2017/0054370 | A1 | 2/2017 | Lee et al. |
| 2019/0280473 | A1 * | 9/2019 | Akahane ................. H02M 7/48 |
| 2020/0014299 | A1 * | 1/2020 | Sun ..................... H02M 3/1588 |
| 2020/0313552 | A1 * | 10/2020 | Babazadeh ............. H02M 3/16 |
| 2022/0294343 | A1 * | 9/2022 | Peretz ................. H02M 3/1566 |
| 2023/0130783 | A1 * | 4/2023 | Bafna .................... H02M 1/15 323/272 |

* cited by examiner

| frep_kHz | 0.3 | | | | | |
|---|---|---|---|---|---|---|
| trans | | | | | | |
| period count | 333_333 | | 266_667 | 200_000 | | |
| filtered period P | 333_334 | 333_334 | 316_666 | 283_333 | 250_000 | 216_666 | 200_000 |

| frep_kHz | 10 | | | | | | 0.001 | | |
|---|---|---|---|---|---|---|---|---|---|
| trans | | | | | | | | | |
| period count | 10_000 | 10_000 | 40 | 80_00 | 160_015 | 320_031 | 640_063 | | 1_048_575 |
| filtered period P | | | 20 | 37_50 | 75_006 | 150_014 | 300_029 | | 1_048_575 |

METHOD AND APPARATUS FOR PERIOD DETECTION-BASED CONTROL OF REGULATION CONTROL PARAMETER

TECHNICAL FIELD

The present disclosure relates to the field of regulated power conversion.

BACKGROUND

Various types of devices may utilize electric power converters that convert one form of electric energy to another, such as by changing a voltage of the electric energy. Some electric power converters are configured to regulate an output voltage and/or an output current at an output.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment, a method is provided. The method may comprise monitoring a signal to detect transient events at an output of a regulated power converter, wherein the transient events comprise a first transient event and a second transient event after the first transient event. The method may comprise determining, in response to detecting the second transient event, a transient event period between the first transient event and the second transient event. The method may comprise setting a regulation control parameter of a control engine controlling the regulated power converter to a value determined based upon the transient event period.

In an embodiment, an apparatus is provided. The apparatus may comprise a means for monitoring a signal to detect transient events at an output of a regulated power converter, wherein the transient events comprise a first transient event and a second transient event after the first transient event. The apparatus may comprise a means for determining, in response to detecting the second transient event, a transient event period between the first transient event and the second transient event. The apparatus may comprise a means for setting a regulation control parameter of a control engine controlling the regulated power converter to a value determined based upon the transient event period.

In an embodiment, an apparatus is provided. The apparatus may comprise a regulated power converter, a control engine configured to control the regulated power converter based upon a regulation control parameter, a period detection system and a parameter control system. The period detection system may be configured to monitor a signal to detect transient events at an output of the regulated power converter, wherein the transient events comprise a first transient event and a second transient event after the first transient event. The period detection system may be configured to determine, in response to the second transient event, a transient event period between the first transient event and the second transient event. The period detection system may be configured to determine transient event period information based upon the transient event period. The parameter control system may be configured to set the regulation control parameter to a value determined based upon the transient event period information.

In an embodiment, an apparatus is provided. The apparatus may comprise a circuit board, a regulated power converter operatively coupled to the circuit board, a control engine operatively coupled to the circuit board, a period detection system operatively coupled to the circuit board and a parameter control system operatively coupled to the circuit board. The control engine may be configured to control the regulated power converter based upon a regulation control parameter. The period detection system may be configured to monitor a signal to detect transient events at an output of the regulated power converter, wherein the transient events comprise a first transient event and a second transient event after the first transient event. The period detection system may be configured to determine, in response to the second transient event, a transient event period between the first transient event and the second transient event. The period detection system may be configured to determine transient event period information based upon the transient event period. The parameter control system may be configured to set the regulation control parameter to a value determined based upon the transient event period information.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIGS. 8B-8D are diagrams illustrating datasets associated with operation of a period detector, according to some embodiments.

DETAILED DESCRIPTION

Figure 1:
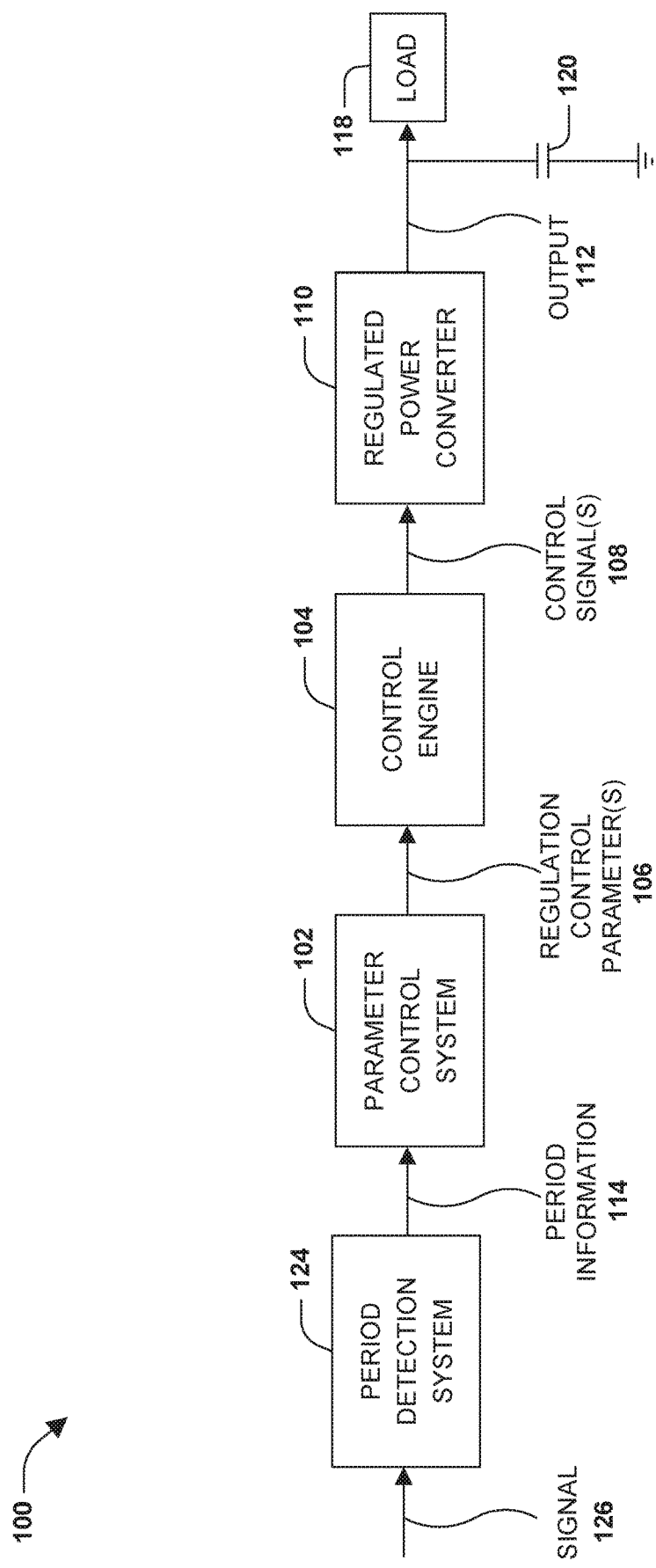
FIG. 1 is a component block diagram illustrating an apparatus with a period detection system, a parameter control system, a control engine and/or a regulated power converter, according to some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Within the field of electronics, a regulated power converter is used to convert one form of electric energy to another and/or regulate an output voltage and/or an output current at an output of the regulated power converter. In an embodiment, a control engine may be configured to control the regulated power converter to reduce a voltage error of the output voltage, such as a difference between the output voltage and a target voltage. One or more regulation control parameters of the control engine, based upon which the control engine controls the regulated power converter, may be adjusted based upon transient events at the output, such as load transients caused by load steps and/or load releases of a load connected to the output.

Some systems require frequency detectors that are used to determine whether a frequency of transient events at the output is within a frequency range, and to control regulation control parameters of the control engine based upon the frequency range. However, such frequency detectors are costly and require a large amount of space. Further, due to a time it takes for a frequency detector to determine and/or validate whether the frequency of transient events is within the frequency range, there may be a delay between a change in frequency and an adjustment to a regulation control parameter based upon the change in frequency. In these systems, a regulation control parameter may be set to a first value based upon a determination that the frequency of transient events is within a first frequency range (e.g., less than a first threshold frequency) and/or may be set to a second value based upon a determination that the frequency of transient events is within a second frequency range (e.g., higher than the first threshold frequency). Thus, using these systems, the regulation control parameter may be changed to different discrete values in a choppy and/or granular manner and/or adjustment of the regulation control parameter may be an abrupt change from the first value to the second value. In some implementations, more frequency detectors are employed to provide for more frequency ranges and/or more values to which the regulation control parameter can be changed. However, adding more frequency detectors requires higher costs and more space. Further, even when more frequency detectors are employed, the regulation control parameter is still changed in a choppy and/or granular manner.

The techniques and apparatuses provided herein are capable of dynamically controlling a regulation control parameter of the control engine based upon transient events at the output of the regulated power converter. In some embodiments, a signal may be monitored to detect transient events at the output of the regulated power converter. Transient event periods between detected transient events may be measured. The regulation control parameter may be controlled based upon the determined transient event periods. For example, a value may be determined based upon a determined transient event period, and the regulation control parameter may be set to the value. Accordingly, using one or more of the techniques and/or apparatuses herein, a value of the regulation control parameter may vary with different transient event frequencies without requiring frequency detectors, resulting in lower costs and less space as compared to systems that employ frequency detectors to control the regulation control parameter. Further, in comparison with systems that employ frequency detectors to control the regulation control parameter, value change of the regulation control parameter over time due to varying transient event frequencies may be smoother, and the regulation control parameter may be more quickly adjusted to respond to a change in transient event frequency, thereby resulting in improved performance of the control engine and/or the regulated power converter.

In an embodiment, an apparatus, comprising a regulated power converter, a control engine, a period detection system and/or a parameter control system, is provided. The parameter control system may be configured to output a regulation control parameter to the control engine. The control engine is configured to control the regulated power converter based upon the regulation control parameter. The regulated power converter may supply power, to a load, at an output of the regulated power converter. For example, the regulated power converter may control and/or regulate an output voltage and/or an output current at the output. In an embodiment, the regulated power converter may comprise a voltage regulator configured to control the output voltage at the output to match a target voltage and/or the regulated power converter may be configured to reduce a voltage error of the output voltage. The voltage error may correspond to a difference between the output voltage and a target voltage. The target voltage may be based upon the load. In some embodiments, the output is connected to a capacitor. The output voltage may correspond to a voltage of the capacitor.

In some embodiments, the period detection system is configured to determine transient event periods between transient events at the output, and provide transient event period information, based upon the transient event periods, to the parameter control system. The period detection system may monitor a signal to detect transient events at the output. For example, the signal may be indicative of (and/or based upon) the voltage error of the output voltage. Alternatively and/or additionally, the signal may be indicative of (and/or based upon) the output current.

In some embodiments, the period detection system determines (e.g., measures) a first transient event period between two transient events comprising a first transient event and a second transient event after the first transient event. In an example, the transient event period may be determined by starting (e.g., restarting) a counter in response to detecting the first transient event. In response to detecting the second transient event, the transient event period may be determined based upon a counter value of the counter (e.g., the transient event period may correspond to the counter value of the counter when the second transient event is detected).

In some embodiments, transient event period information may be determined based upon the transient event period. For example, the transient event period information may comprise at least one of the transient event period, a filtered transient event period determined based upon the transient event period, a transient event frequency determined based upon the transient event period (and/or based upon the filtered transient event period), etc. In some examples, the filtered transient event period may be determined based upon one or more transient event periods (e.g., one or more most recently determined transient event periods) comprising the transient event period. In an example, the filtered transient event period may be an average of the one or more transient event periods. The filtered transient event period may correspond to an n-sample moving average, wherein n corresponds to a number of transient event periods, of the one or more transient event periods, that are averaged to determine the filtered transient event period. In an example in which the filtered transient event period is a 4-sample moving average, the filtered transient event period may be equal to an average of four transient event periods (e.g., four most recently determined transient event periods). The transient event period information may be provided to the parameter control system, wherein the parameter control system controls the regulation control parameter based upon the transient event period information. For example, the parameter control system may determine a value for the regulation control parameter based upon the transient event period information, and may set the regulation control parameter to the value.

In some examples, transient events detected by the period detection system comprise under-voltage transient events at the output of the regulated power converter. In an example, an under-voltage transient event may correspond to a current increase at the output of the regulated power converter, such as the current at the output increasing to above a first threshold current. Alternatively and/or additionally, the under-voltage transient event may correspond to the voltage error crossing (e.g., increasing to above or decreasing to below) a first threshold voltage error. For example, the under-voltage transient event may be caused by a load step of the load connected to the output of the regulated power converter. The load step may correspond to an increase in power consumption by the load, where the increase in power consumption may cause charge in the capacitor to discharge at a higher rate than prior to the load step (and thus may cause the under-voltage transient event, for example). The under-voltage transient event may correspond to an under-voltage event of the capacitor.

In some examples, transient events detected by the period detection system comprise over-voltage transient events at the output of the regulated power converter. In an example, an over-voltage transient event may correspond to a current decrease at the output of the regulated power converter, such as the current at the output decreasing to below a second threshold current. Alternatively and/or additionally, the over-voltage transient event may correspond to the voltage error crossing (e.g., increasing to above or decreasing to below) a second threshold voltage error. For example, the over-voltage transient event may be caused by a load release of the load. The load release may correspond to a decrease in power consumption by the load, where the decrease in power consumption may cause charge in the capacitor to discharge at a lower rate than prior to the load release (and thus may cause the over-voltage transient event, for example). The over-voltage transient event may correspond to an over-voltage event of the capacitor.

In some embodiments, the period detection system determines transient event periods between under-voltage transient events and transient event periods between over-voltage transient events. For example, a first transient event period between two under-voltage transient events may be determined. The two under-voltage transient events may be consecutive under-voltage transient events (e.g., there may not be another detected under-voltage transient event between the two under-voltage transient events). A first filtered transient event period may be determined based upon one or more first transient event periods, comprising the first transient event period, determined based upon detected under-voltage transient events comprising the two under-voltage transient events. For example, the first filtered transient event period may be an average of the one or more first transient event periods. The one or more first transient event periods may comprise a set of n transient event periods (e.g., n most recent transient event periods that are determined based upon detected under-voltage transient events).

Alternatively and/or additionally, a second transient event period between two over-voltage transient events may be determined. The two over-voltage transient events may be consecutive over-voltage transient events (e.g., there may not be another detected over-voltage transient event between the two over-voltage transient events). A second filtered transient event period may be determined based upon one or more second transient event periods, comprising the second transient event period, determined based upon detected over-voltage transient events comprising the two over-voltage transient events. For example, the second filtered transient event period may be an average of the one or more second transient event periods (e.g., most recently determined transient event periods). The one or more second transient event periods may comprise a set of n transient event periods (e.g., n most recent transient event periods that are determined based upon detected over-voltage transient events).

In some examples, a filtered transient event period may be selected, from among the first filtered transient event period and the second filtered transient event period, for use in determining the transient event period information to be provided to the parameter control system. The filtered transient event period may be selected based upon a first difference between the first filtered transient event period and the first transient event period (e.g., the first transient event period may correspond to a period between two most recently detected under-voltage transient events) and a second difference between the second filtered transient event period and the second transient event period (e.g., the second transient event period may correspond to a period between two most recently detected over-voltage transient events). In an example, the first difference and the second difference may be compared. The first filtered transient event period may be selected based upon a determination that the first difference is smaller than the second difference. The second filtered transient event period may be selected based upon a determination that the second difference is smaller than the first difference. In an example in which the first filtered transient event period is selected, the transient event period information may be generated based upon the first filtered transient event period (e.g., the transient event period information may comprise the first filtered transient event period, a transient event frequency determined based upon the first filtered transient event period, etc.). Alternatively and/or additionally, in an example in which the second filtered transient event period is selected, the transient event period information may be generated based upon the second filtered transient event period. It may be appreciated that selecting the filtered transient event period (e.g., the first filtered transient event period or the second filtered transient event period) associated with the smaller difference may provide for an increased accuracy of the transient event period information, and thus, improved performance of the apparatus 100.

In some examples, one or more thresholds based upon which transient events (e.g., under-voltage transient events and/or over-voltage transient events) are determined may be dynamically adjusted. The one or more thresholds may comprise the first threshold current, the first threshold voltage error, the second threshold current and/or the second threshold voltage error. For example, the parameter control system may be configured to modify (e.g., adjust) the one or more thresholds based upon the transient event period information, a transient event period, a filtered transient event period and/or a transient event frequency (determined based upon the filtered transient event period, for example).

In some embodiments, the period detection system continuously monitors the signal (e.g., at least one of voltage error signal, output current signal, etc.) to detect transient events and/or determine transient event periods. Alternatively and/or additionally, the period detection system may continuously determine the transient event period information (e.g., at least one of a transient event period, a filtered transient event period, a transient event frequency, etc.) based upon detected transient events and/or continuously provide the transient event period information (e.g., updated transient event period information) to the parameter control system. Alternatively and/or additionally, the parameter control system may continuously monitor the transient event period information and/or may continuously control (e.g., adjust and/or modulate) the regulation control parameter based upon the transient event period information. For example, in response to detecting a period change and/or a frequency change indicated by the transient event period information, the parameter control system may adjust the regulation control parameter based upon the transient event period information.

In some embodiments, the period detection system monitors the signal and/or outputs the transient event period information (and/or the parameter control system controls the regulation control parameter based upon the transient event period information) over a period of time. In an example, the period of time may be a fixed duration of time. Alternatively and/or additionally, the period of time may not be a fixed duration of time. In some examples, the period of time ends (and thus, the period detection system may stop monitoring the signal and/or stop outputting the transient event period information) in response to one or more conditions being satisfied. For example, the one or more conditions may be satisfied when at least one of the regulated power converter is shut off (e.g., powered down and/or deactivated), the parameter control system is shut off, the control engine is shut off, etc.

In some embodiments, the apparatus comprises a circuit board, wherein the regulated power converter, the control engine, the period detection system, the parameter control system and/or the load are operatively coupled to the circuit board. The regulated power converter, the control engine, the period detection system and/or the parameter control system may be affixed to and/or fabricated on the circuit board.

In one embodiment, one or more first components of the apparatus may be affixed to and/or fabricated on a first circuit board and/or one or more second components may be affixed to and/or fabricated on a second circuit board. The second circuit board may be coupled to the first circuit board. For example, the second circuit board may be slotted into the first circuit board (e.g., the second circuit board may be coupled to the first circuit board via a slot, such as at least one of an expansion slot, an expansion port, etc.). In an example, the one or more first components may comprise the control engine, the period detection system and/or the parameter control system. The one or more second components may comprise the regulated power converter and/or the load.

In some examples, the parameter control system may comprise (e.g., may be implemented by) hardware (e.g., dedicated hardware), a processor (e.g., a central processing unit (CPU)) and/or firmware (e.g., firmware on the processor).

FIG. 1 illustrates an apparatus 100 according to some embodiments. The apparatus 100 comprises a period detection system 124, a parameter control system 102, a control engine 104, and/or a regulated power converter 110. The period detection system 124 may be configured to output transient event period information 114 to the parameter control system 102. For example, the period detection system 124 may monitor a signal 126 to detect transient events, and may determine the transient event period information 114 based upon the detected transient events. The parameter control system 102 may be configured to output one or more regulation control parameters 106 to the control engine 104. The parameter control system 102 may control the one or more regulation control parameters 106 based upon the transient event period information 114. The control engine 104 is configured to control the regulated power converter 110 based upon the one or more regulation control parameters 106. For example, the control engine 104 may control the regulated power converter 110 using one or more control signals 108. In some examples, the control engine 104 may generate the one or more control signals 108 based upon the one or more regulation control parameters 106. The regulated power converter 110 may control and/or regulate an output voltage and/or an output current at an output 112 of the regulated power converter 110. In an embodiment, the regulated power converter 110 may comprise a voltage regulator configured to control the output voltage at the output to match a target voltage and/or the regulated power converter 110 may be configured to reduce a voltage error of the output voltage. The voltage error may correspond to a difference between the output voltage and the target voltage. In some embodiments, the output 112 is connected to a capacitor 120. The output voltage may correspond to a voltage of the capacitor 120. The output 112 may be connected to a load 118 to which the regulated power converter 110 supplies power, for example.

Figure 2:
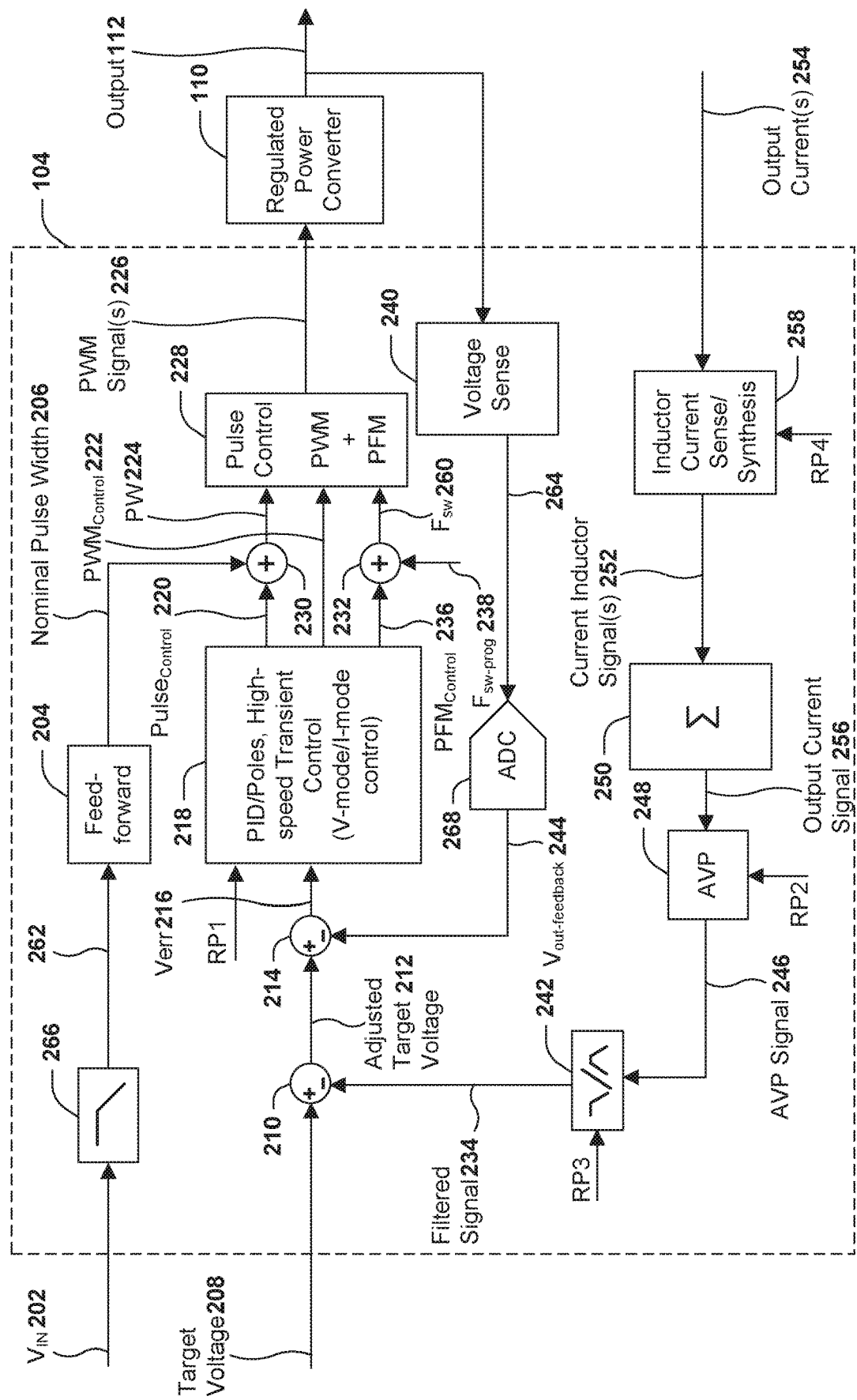
FIG. 2 is a component block diagram illustrating a control engine and/or a regulated power converter, according to some embodiments.

FIG. 2 illustrates the control engine 104, the regulated power converter 110 and/or the one or more regulation control parameters 106 (examples of which are shown with labels "RP1", "RP2", "RP3" and "RP4" in FIG. 2). In some embodiments, the regulated power converter 110 may comprise a voltage regulator, the control engine 104 may comprise a multi-phase buck control engine, and/or the one or more control signals 108 (output by the control engine 104 to the regulated power converter 110) may comprise a set of pulse width modulation (PWM) signals 226. The output voltage at the output 112 may be based upon the set of PWM signals 226.

In some embodiments, the regulated power converter 110 may comprise a multi-phase buck converter associated with a set of phases. The multi-phase buck converter may comprise a set of phase circuits configured to generate, based upon the set of PWM signals 226, the output voltage and/or the output current at the output 112. Each phase circuit of the set of phase circuits may be associated with a phase of the set of phases. Each PWM signal of the set of PWM signals may be associated with a phase of the set of phases (e.g., the PWM signal may control a phase circuit of the set of phase circuits associated with the phase). For example, each phase circuit of the set of phase circuits may comprise high side switch circuitry and/or low side switch circuitry controlled based upon a PWM signal of the set of PWM signals 226. Alternatively and/or additionally, each phase circuit of the set of phase circuits may comprise an inductor through which current is output (to the load 118, for example). Switching (e.g., controlled switching) of high side switch circuitry and low side switch circuitry of the set of phase circuits based upon the set of PWM signals may result in generation of the output voltage and/or the output current. In one embodiment, the regulated power converter 110 converts input voltage 202 to the output voltage at the output 112.

In some embodiments, a voltage error signal 216 may be generated based upon an output voltage feedback signal 244 and/or a target voltage signal 208 indicative of the target voltage of the regulated power converter 110. The output voltage feedback signal 244 may be indicative of the output voltage at the output 112 and/or other voltage determined using the output voltage. In some examples, the output voltage feedback signal 244 may be output by an analog-to-digital converter 268. For example, the analog-to-digital converter 268 may generate the output voltage feedback signal 244 based upon a voltage sense output 264 of a voltage monitor 240 (connected to the output 112, for example)

In some embodiments, the control engine 104 comprises a current monitor 258 (e.g., an inductor current sense module and/or an inductor current synthesis module) configured to monitor output current 254 supplied by the regulated power converter 110, such as current supplied by each phase circuit of the set of phase circuits. For example, the control engine 104 may monitor (such as at least one of emulate, calculate, synthesize, measure, simulate, etc.) a respective amount of current supplied by each phase circuit of the set of phase circuits through respective inductors to the load 118.

The current monitor 258 is configured to generate one or more inductor current signals 252. In some embodiments, each inductor current signal of the one or more inductor current signals 252 is indicative of a magnitude of a current through an inductor of a phase circuit of the set of phase circuits. For example, a first inductor current signal of the one or more inductor current signals 252 may be indicative of a first current supplied by a first phase circuit of the set of phase circuits to the load 118, a second inductor current signal of the one or more inductor current signals 252 may be indicative of a second current supplied by a second phase circuit of the set of phase circuits to the load 118, etc.

In some embodiments, the control engine 104 comprises a combination module 250 (e.g., a summer module that performs a sum function) configured to sum the one or more inductor current signals 252 (e.g., sum the current magnitudes indicated by the one or more inductor current signals 252) and/or generate an output current signal 256 (e.g., a summation signal) indicative of the sum. For example, the output current signal 256 may be indicative of output current at the output 112 and/or supplied to the load (e.g., the output current signal 256 may be indicative of a total magnitude of output current at the output 112 and/or supplied to the load 118).

In some embodiments, the control engine 104 comprises an adaptive voltage positioning (AVP) controller 248 configured to receive the output current signal 256 and/or generate an adaptive voltage feedback signal 246 (e.g., an AVP signal) based upon the output current signal 256. In some embodiments, the control engine 104 comprises an AVP filtering module 242 configured to receive the adaptive voltage feedback signal 246 and/or generate a filtered adaptive voltage feedback signal 234 based upon the adaptive voltage feedback signal 246. For example, the adaptive voltage feedback signal 246 may be filtered to generate the filtered adaptive voltage feedback signal 234 (e.g., the filtered adaptive voltage feedback signal 234 may be a filtered version of the adaptive voltage feedback signal 246). In some embodiments, the filtered adaptive voltage feedback signal 234 is a target voltage adjustment signal used (by a combination module 210, for example) to generate an adjusted target voltage signal 212. For example, the combination module 210 (e.g., a subtractor module that performs a difference function) may generate the adjusted target voltage signal 212 based upon a difference between the target voltage signal 208 and the filtered adaptive voltage feedback signal 234. In one embodiment, the combination module 210 may output the adjusted target voltage signal 212 as equal to the target voltage signal 208 minus the filtered adaptive voltage feedback signal 234. In some embodiments, the voltage error signal 216 may be generated using a combination module 214 (e.g., a subtractor module that performs a difference function) based upon the output voltage feedback signal 244 and/or the adjusted target voltage signal 212. For example, the voltage error signal 216 may be based upon a difference between the output voltage feedback signal 244 and the adjusted target voltage signal 212. In one embodiment, the combination module 214 may output the voltage error signal 216 as equal to the adjusted target voltage signal 212 minus the output voltage feedback signal 244.

In some embodiments, the control engine 104 comprises a control module 218 comprising at least one of a transient control module (e.g., a high speed transient control module operating in load transients mode), a controller (e.g., a Proportional Integral Derivative (PID) controller) comprising poles and/or other circuitry, etc. In some examples, the control module 218 may employ at least one of a current mode control (I-mode control) scheme, a voltage mode control (V-mode control) scheme, etc.

In some embodiments, the control module 218 receives the voltage error signal 216. The control module 218 may generate one or more signals based upon the voltage error signal 216. The one or more signals may comprise one or more pulse control signals 220, a PWM control signal 222 and/or a pulse frequency modulation (PFM) control signal 236. In an embodiment where the control module 218 comprises the transient control module (e.g., the high speed transient control module), the PFM control signal 236 is output by the transient control module. For example, the transient control module may generate the PFM control signal 236 based upon the voltage error signal 216. In some embodiments, the PFM control signal 236 is a switching frequency adjustment signal used (by a combination module 232, for example) to generate a switching frequency signal 260 ($F_{sw}$). For example, the combination module 232 (e.g., a summer module that performs a sum function) may generate the switching frequency signal 260 based upon a summation of the PFM control signal 236 and a nominal switching frequency signal 238. In one embodiment, the combination module 232 may output the switching frequency signal 260 as equal to the nominal switching frequency signal 238 plus the PFM control signal 236 (wherein the PFM control signal 236 may be positive or negative, for example).

In some embodiments, the control engine comprises a feed-forward module 204 configured to generate a nominal pulse width signal 206 based upon a filtered input voltage 262. The filtered input voltage 262 may be generated, by a filtering module 266, based upon the input voltage 202 (e.g., the filtering module 266 may filter the input voltage 202 to generate the filtered input voltage 262). In an example, the filtering module 266 is a low-pass filter. In one embodiment, the nominal pulse width signal 206 is indicative of a duty cycle value such as percentage value or other suitable value indicating a portion of a switching period to activate high side switch circuitry for each phase circuit of the set of phase circuits. Alternatively and/or additionally, the feed-forward module 204 may be configured to generate the nominal pulse width signal 206 based upon the target voltage signal 208 (e.g., the target voltage signal 208 may be input to the feed-forward module 204). In one embodiment, the nominal pulse width signal 206 is calculated as the target voltage signal 208 divided by the magnitude of the filtered input voltage 262 being converted into the output voltage at the output 112.

One or more pulse width control information signals 224 may be generated based upon the nominal pulse width signal 206 and/or the one or more pulse control signals 220. For example, the one or more pulse width control information signals 224 may control a duty cycle (e.g., pulse width such as switch ON-time and switch OFF-time) of a corresponding switching period of a PWM signal of the set of PWM signals 226. In some embodiments, the one or more pulse width control information signals 224 may be generated using a combination module 230 (e.g., a subtractor module that performs a difference function) based upon the nominal pulse width signal 206 and/or the one or more pulse control signals 220. For example, a pulse width control information signal of the one or more pulse width control information signals 224 may be based upon a difference between the nominal pulse width signal 206 and a pulse control signal of the one or more pulse control signals 220 (wherein the pulse control signal is indicative of pulse width adjustment associated with a phase circuit of the set of phase circuits, and/or wherein a PWM signal of the set of PWM signals 226 is generated based upon the pulse width control information signal).

In some embodiments, the control engine 104 comprises a PWM generator 228 configured to receive the one or more pulse width control information signals 224, the PWM control signal 222 and/or the switching frequency signal 260. The PWM generator 228 may be configured to generate the set of PWM signals 226 based upon the one or more pulse width control information signals 224, the PWM control signal 222 and/or the switching frequency signal 260.

In some embodiments, operation of one or more components of the control engine 104 is based upon (and/or controlled by) the one or more regulation control parameters 106 (output by the parameter control system 102, for example). In some embodiments, the one or more regulation control parameters 106 comprise one or more first regulation control parameters RP1 input to the control module 218, one or more second regulation control parameters RP2 input to the AVP controller 248, one or more third regulation control parameters RP3 input to the AVP filtering module 242, one or more fourth regulation control parameters RP4 input to the current monitor 258, and/or one or more other regulation control parameters (not shown) input to one or more other components of the control engine.

In an embodiment, the one or more first regulation control parameters RP1 may comprise at least one of one or more non-linear gain parameters of the control module 218, one or more PID parameters (e.g., one or more linear PID parameters) of the PID controller of the control module 218, etc. For example, the one or more PID parameters may comprise a PID compensator gain parameter. The control module 218 may generate the one or more pulse control signals 220, the PWM control signal 222 and/or the PFM control signal 236 based upon the one or more first regulation control parameters RP1. Alternatively and/or additionally, the one or more second regulation control parameters RP2 may comprise an AVP droop level of the AVP controller 248. In some examples, output impedance of the control engine 104 and/or the regulated power converter 110 may be modified and/or controlled by modifying and/or controlling the AVP droop level. The AVP controller 248 may generate the adaptive voltage feedback signal 246 based upon the one or more second regulation control parameters RP2. Alternatively and/or additionally, the one or more third regulation control parameters RP3 may comprise an AVP bandwidth of the AVP filtering module 242. The AVP filtering module 242 may generate the filtered adaptive voltage feedback signal 234 based upon the one or more third regulation control parameters RP3. Alternatively and/or additionally, the one or more fourth regulation control parameters RP4 may comprise an inductor current synthesis parameter of the current monitor 258. The current monitor 258 may generate the one or more inductor current signals 252 based upon the one or more fourth regulation control parameters RP4. For example, the current monitor 258 may synthesize a magnitude of a current supplied by a phase circuit of the set of phase circuits based upon the inductor current synthesis parameter, wherein an inductor current signal of the one or more inductor current signals 252 is indicative of the magnitude of the current. In an embodiment, the one or more regulation control parameters 106 comprise an output voltage offset parameter (e.g., v_lift) of the control engine 104, a control current boost parameter of the control engine 104, a current balance parameter of the control engine 104 and/or a frequency boost parameter of the control engine 104. In some examples, behavior of the control engine 104 and/or the regulated power converter 110 may be modified and/or controlled (e.g., dynamically modified and/or controlled) by modifying and/or controlling the current balance parameter.

Figure 3:
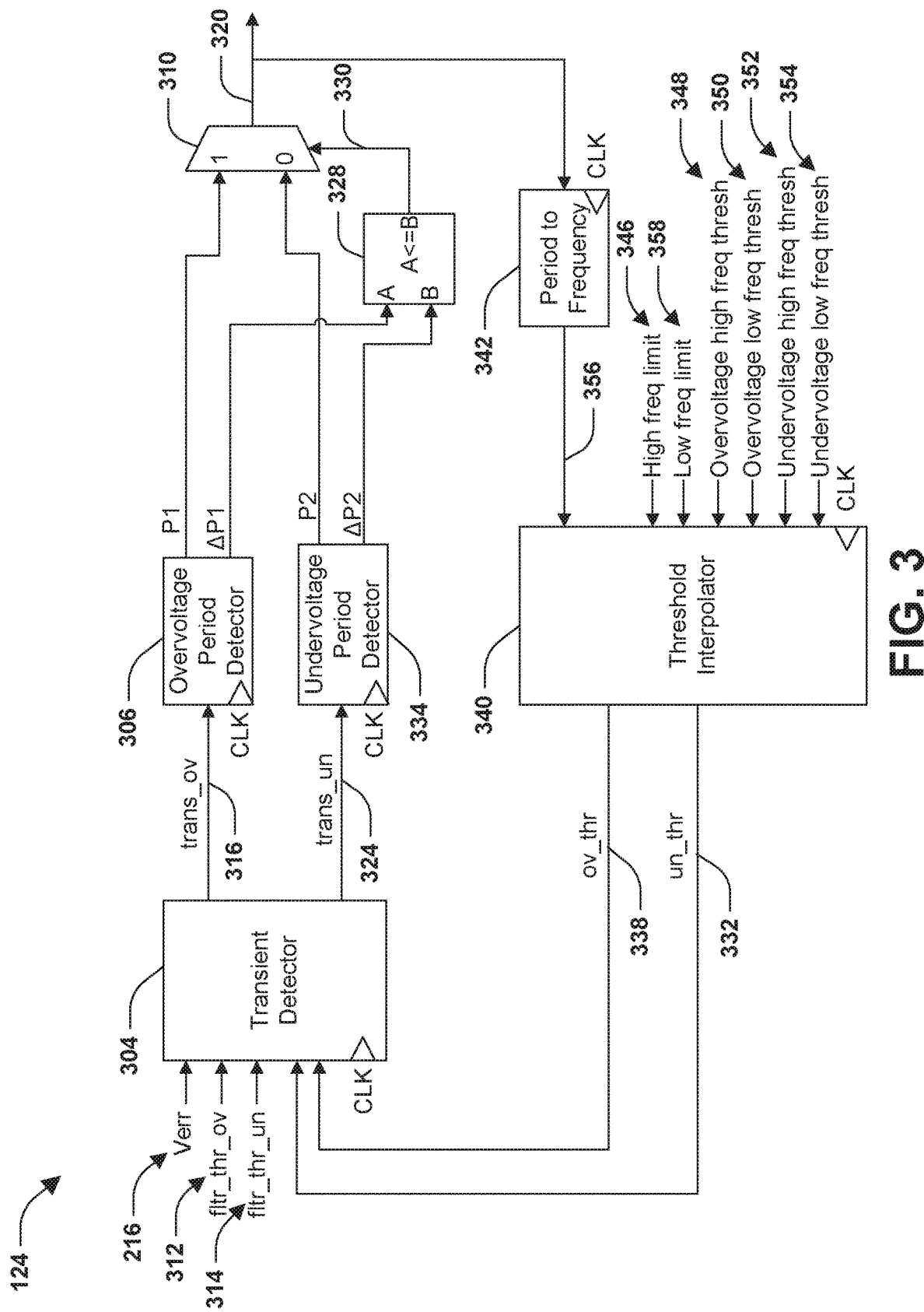
FIG. 3 is a component block diagram illustrating a period detection system, according to some embodiments.

FIG. 3 illustrates the period detection system 124 according to some embodiments. In the embodiment shown in FIG. 3, the signal 126 comprises the voltage error signal 216 indicative of the voltage error (e.g., the difference between the output voltage and the target voltage). Embodiments are contemplated in which the signal 126 comprises a signal other than the voltage error signal 216, such as at least one of a signal that is based upon the voltage error (e.g., the signal may be indicative of a value that is a function of the voltage error), a signal indicative of a slope of the voltage error, a signal that is indicative of the output current, a signal that is based upon the output current (e.g., the signal may be indicative of a value that is a function of the output current), a signal indicative of a slope of the output current, a current control signal (e.g., used in current mode control scheme), a current error signal (e.g., used in current mode control scheme), etc.

The period detection system 124 may comprise a transient event detector 304 configured to detect transient events (e.g., under-voltage transient events and/or over-voltage transient events) at the output 112. The transient event detector 304 may output one or more signals indicative of occurrence of transient events. For example, the one or more signals may comprise an over-voltage transient event signal 316 (shown as "trans_ov") indicative of occurrences of over-voltage transient events and/or an under-voltage transient event signal 324 (shown as "trans_un") indicative of occurrences of under-voltage transient events. In some examples, the transient event detector 304 may monitor the voltage error signal 216 to detect transient events (e.g., the under-voltage transient events and/or the over-voltage transient events). The transient event detector 304 may detect transient events and/or output the one or more signals based upon an over-voltage threshold signal 338 (shown as "ov_thr") indicative of an over-voltage threshold and/or an under-voltage threshold signal 332 (shown as "un_thr") indicative of an under-voltage threshold. For example, the over-voltage threshold may be a first threshold voltage error and/or the under-voltage threshold may be a second threshold voltage error. Alternatively and/or additionally, the transient event detector 304 may detect transient events and/or output the one or more signals based upon an over-voltage transient event filtering threshold 312 (shown as "fltr_thr_ov") and/or an under-voltage transient event filtering threshold 314 (shown as "fltr_thr_un").

In some examples, the period detection system 124 comprises one or more period detectors. A period detector of the one or more period detectors determines a transient event period between two transient events (e.g., two consecutive transient events). For example, the one or more period detectors may comprise an over-voltage period detector 306 configured to determine transient event periods between over-voltage transient events. The over-voltage period detector 306 may output a first filtered period P1 and a first period difference ΔP1. The first filtered period P1 may be determined based upon one or more transient event periods (e.g., one or more most recently determined transient event periods) determined based upon over-voltage transient events (e.g., most recently detected over-voltage transient events). In an example, the first filtered period P1 may be an average of the one or more transient event periods. The first filtered period P1 may correspond to an n-sample moving average, wherein n corresponds to a number of transient event periods, of the one or more transient event periods, that are averaged to determine the first filtered period P1. In an example in which the first filtered period P1 is a 4-sample moving average, the first filtered period P1 may be equal to an average of four transient event periods (e.g., four transient event periods based upon most recently detected over-voltage transient events). In some examples, the first period difference ΔP1 may correspond to a difference between the first filtered period P1 and a transient event period determined based upon two most recently detected over-voltage transient events.

Alternatively and/or additionally, the one or more period detectors may comprise an under-voltage period detector 334 configured to determine transient event periods between under-voltage transient events. The under-voltage period detector 334 may output a second filtered period P2 and a second period difference ΔP2. The second filtered period P2 may be determined based upon one or more transient event periods (e.g., one or more most recently determined transient event periods) determined based upon under-voltage transient events (e.g., most recently detected under-voltage transient events). In an example, the second filtered period P2 may be an average of the one or more transient event periods. The second filtered period P2 may correspond to an n-sample moving average, wherein n corresponds to a number of transient event periods, of the one or more transient event periods, that are averaged to determine the second filtered period P2. In an example in which the second filtered period P2 is a 4-sample moving average, the second filtered period P2 may be equal to an average of four transient event periods (e.g., four transient event periods based upon most recently detected under-voltage transient events). In some examples, the second period difference ΔP2 may correspond to a difference between the second filtered period P2 and a transient event period determined based upon two most recently detected under-voltage transient events.

In some examples, a filtered period may be selected, from among the first filtered period P1 and the second filtered period P2, for use in determining the transient event period information 114 (e.g., the filtered period may be selected for inclusion in the transient event period information 114). For example, the filtered period may be selected based upon the first period difference ΔP1 and the second period difference ΔP2. The filtered period may be selected using a comparator 328, such as a digital comparator. The comparator 328 may output a signal 330 based upon the first period difference ΔP1 and the second period difference ΔP2. In an example, the signal 330 may be indicative of whether the first period difference ΔP1 is smaller than the second period difference ΔP2 or the second period difference ΔP2 is smaller than the first period difference ΔP1. For example, the signal 330 may be 1 if the first period difference ΔP1 is smaller than or equal to the second period difference ΔP2. The signal 330 may be 0 if the first period difference ΔP1 is larger than the second period difference ΔP2. A component 310 (e.g., selection component) may output a period signal 320 indicative of the selected filtered period. For example, the period signal 320 may be indicative of the first filtered period P1 if the signal 330 is 1. The period signal 320 may be indicative of the second filtered period P2 if the signal 330 is 0. Accordingly, the first filtered period P1 may be selected if the first period difference ΔP1 is smaller than or equal to the second period difference ΔP2. The second filtered period P2 may be selected if the second period difference ΔP2 is smaller than the first period difference ΔP1. In some examples, the transient event period information 114 may be based upon the period signal 320. In an example, the transient event period information 114 may comprise the selected filtered period indicated by the period signal 320.

In some examples, the over-voltage threshold and/or the under-voltage threshold may be modified (e.g., dynamically adjusted) based upon the period signal 320. For example, the over-voltage threshold and/or the under-voltage threshold may be controlled based upon the selected filtered period (indicated by the period signal 320). In an example, the period signal 320 may be input to a period to frequency component 342. The period to frequency component 342 may generate a frequency signal 356 based upon the period signal 320. The frequency signal 356 may be indicative of a frequency determined based upon the selected filtered period indicated by the period signal 320. For example, one or more operations (e.g., mathematical operations) may be performed using the selected filtered period to determine the frequency. The frequency signal 356 may be input to a threshold interpolator 340 configured to generate the over-voltage threshold signal 338 "ov_thr" and the under-voltage threshold signal 332 "un_thr" based upon the frequency signal 456. Alternatively and/or additionally, the threshold interpolator 340 may generate the over-voltage threshold signal 338 "ov_thr" and the under-voltage threshold signal 332 "un_thr" based upon a high frequency limit 346, a low frequency limit 358, an over-voltage high frequency threshold 348, an over-voltage low frequency threshold 350, an under-voltage high frequency threshold 352 and/or an under-voltage low frequency threshold 354. In some examples, the threshold interpolator 340 may be configured to modify (e.g., dynamically adjust) the over-voltage threshold signal 338 "ov_thr" and the under-voltage threshold signal 332 "un_thr" based upon the frequency signal 456, such as in response to frequency changes indicated by the frequency signal 356.

Alternatively and/or additionally, in some examples, the over-voltage transient event filtering threshold 312 "fltr_thr_ov" and/or the under-voltage transient event filtering threshold 314 "fltr_thr_un" may be modified (e.g., dynamically adjusted) based upon the period signal 320, such as based upon the frequency signal 356 generated based upon the period signal 320. In an example, the over-voltage transient event filtering threshold 312 "fltr_thr_ov" and/or the under-voltage transient event filtering threshold 314 "fltr_thr_un" may be modified (e.g., dynamically adjusted) by the threshold interpolator 340, such as in response to frequency changes indicated by the frequency signal 356.

In some examples, the transient event period information 114 may be based upon the frequency signal 356. In an example, the transient event period information 114 may comprise the frequency indicated by the frequency signal 356.

Embodiments are contemplated in which merely one of the first filtered period P1 or the second filtered period P2 is determined (e.g., based upon over-voltage transient events or under-voltage transient events), wherein at least one of the determined filtered period is output by the period detection system 124, the determined filtered period is indicated by the period signal 320, the determined filtered period is used to determine the transient event period information 114 (e.g., the determined filtered period may be included in the transient event period information 114), the determined filtered period is used to determine a frequency (e.g., a transient oscillation frequency, such as the frequency indicated by the frequency signal 356), the determined filtered period is used to modify and/or control a regulation control parameter (based upon the determined filtered period, for example), etc.

Figure 4:
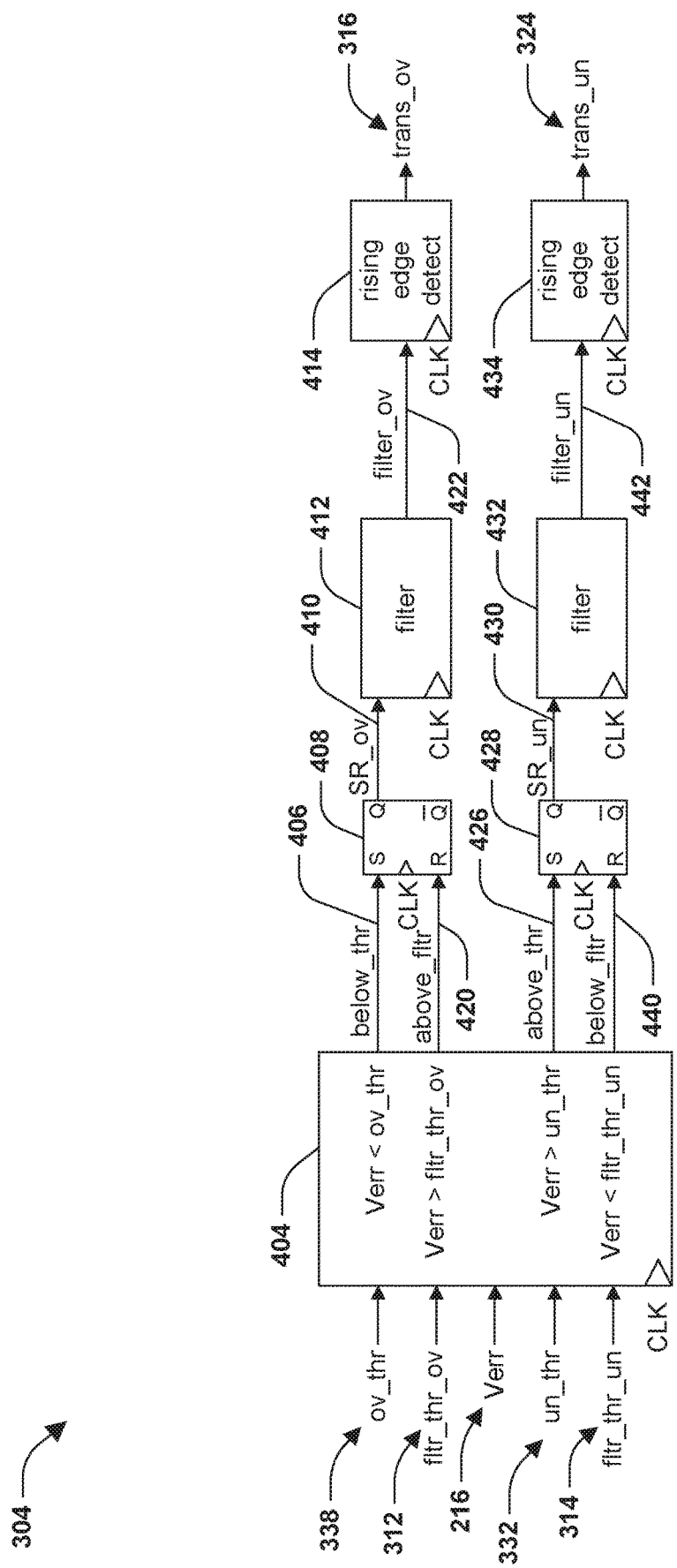
FIG. 4 is a component block diagram illustrating a transient event detector, according to some embodiments.

FIG. 4 illustrates a first example embodiment of the transient event detector 304 in which the transient event detector 304 detects transient events and/or outputs the one or more signals based upon the over-voltage transient event filtering threshold 312 "fltr_thr_ov" and/or the under-voltage transient event filtering threshold 314 "fltr_thr_un".

In some examples, the transient event detector 304 detects an over-voltage transient event based upon a determination that the voltage error (indicated by the voltage error signal 216) decreases to below the over-voltage threshold (indicated by the over-voltage threshold signal 338 "ov_thr"). Alternatively and/or additionally, the transient event detector 304 detects an over-voltage transient event based upon a determination that the voltage error (indicated by the voltage error signal 216) decreases to below the over-voltage threshold, and that prior to the voltage error decreasing to below the over-voltage threshold, the voltage error exceeded the over-voltage transient event filtering threshold 312 "fltr_thr_ov" at least once since the most recently detected over-voltage event prior to the voltage error decreasing to below the over-voltage threshold. That is, the voltage error decreasing to below the over-voltage threshold is considered to be an over-voltage transient event if, since the most recently detected over-voltage transient event prior to the voltage error decreasing to below the over-voltage threshold, the voltage error exceeded the over-voltage transient event filtering threshold 312 "fltr_thr_ov". In some examples, in response to (e.g., upon) detection of an over-voltage transient event, the transient event detector 304 outputs a pulse via the over-voltage transient event signal 316 "trans_ov", wherein the pulse indicates occurrence of the over-voltage transient event.

In some examples, the transient event detector 304 detects an under-voltage transient event based upon a determination that the voltage error (indicated by the voltage error signal 216) increases to above the under-voltage threshold (indicated by the under-voltage threshold signal 332 "un_thr"). Alternatively and/or additionally, the transient event detector 304 detects an under-voltage transient event based upon a determination that the voltage error (indicated by the voltage error signal 216) increases to above the under-voltage threshold, and that prior to the voltage error increasing to above the under-voltage threshold, the voltage error decreased to below the under-voltage transient event filtering threshold 314 "fltr_thr_un" at least once since the most recently detected under-voltage event. That is, the voltage error increasing to above the under-voltage threshold is considered to be an under-voltage transient event if, since the most recently detected under-voltage transient event, the voltage error decreased to below the under-voltage transient event filtering threshold 314 "fltr_thr_un". In some examples, in response to (e.g., upon) detection of an under-voltage transient event, the transient event detector 304 outputs a pulse via the under-voltage transient event signal 324 "trans_un", wherein the pulse indicates occurrence of the under-voltage transient event.

In some examples described herein and shown in timing diagrams 500 and 700, the voltage error increases when the output voltage decreases (e.g., the voltage error may correspond to the target voltage subtracted by the output voltage). However, in some embodiments, the voltage error may decrease when the output voltage decreases (e.g., the voltage error may correspond to the output voltage subtracted by the target voltage).

In embodiments in which the voltage error decreases when the output voltage decreases, an over-voltage transient event may be detected based upon a determination that the voltage error increases to above a second over-voltage threshold (and/or based upon a determination that prior to the voltage error increasing to above the second over-voltage threshold, the voltage error decreased to below a second over-voltage transient event filtering threshold at least once since the most recently detected over-voltage event prior to the voltage error increasing to above the second over-voltage threshold). In an example, a polarity of the second over-voltage threshold may be opposite a polarity of the over-voltage threshold and/or a polarity of the second over-voltage transient event filtering threshold may be opposite a polarity of the over-voltage transient event filtering threshold 312 "fltr_thr_ov".

In embodiments in which the voltage error decreases when the output voltage decreases, an under-voltage transient event may be detected based upon a determination that the voltage error decreases to below a second under-voltage threshold (and/or based upon a determination that prior to the voltage error decreasing to below the second under-voltage threshold, the voltage error exceeded a second under-voltage transient event filtering threshold at least once since the most recently detected under-voltage event prior to the voltage error decreasing to below the second over-voltage threshold). In an example, a polarity of the second under-voltage threshold may be opposite a polarity of the under-voltage threshold and/or a polarity of the second under-voltage transient event filtering threshold may be opposite a polarity of the under-voltage transient event filtering threshold 314 "fltr_thr_un".

In some examples, a component 404 (e.g., comparison component) generates signals 406, 420, 426 and/or 440 based upon the over-voltage threshold (indicated by the over-voltage threshold signal 338 "ov_thr"), the over-voltage transient event filtering threshold 312 "fltr_thr_ov", the under-voltage threshold (indicated by the under-voltage threshold signal 332 "un_thr") and/or the under-voltage transient event filtering threshold 314 "fltr_thr_un". In some examples, the signals 406, 420, 426 and/or 440 may be generated using comparators (e.g., digital comparators, such as window comparators) of the component 404.

The signal 406 "below_thr" may indicate whether the voltage error is below the over-voltage threshold (e.g., the signal 406 may be 1 if the voltage error is below the over-voltage threshold and/or may be 0 if the voltage error is not below the over-voltage threshold). The signal 420 "above_fltr" may indicate whether the voltage error is above the over-voltage transient event filtering threshold 312 "fltr_thr_ov" (e.g., the signal 420 may be 1 if the voltage error is above the over-voltage transient event filtering threshold 312 "fltr_thr_ov" and/or may be 0 if the voltage error is not above the over-voltage transient event filtering threshold 312 "fltr_thr_ov").

A logical component 408 (e.g., a set-reset (SR) latch) may generate a signal 410 "SR_ov" based upon the signal 406 "below_thr" and the signal 420 "above_fltr". An example truth table of one, some and/or all SR latches shown in FIGS. 4 and 6 herein is provided below:

| S | R | Q |
|---|---|---|
| 0 | 0 | hold value |
| 0 | 1 | 0 |
| 1 | 0 | 1 |
| 1 | 1 | 0 |

In some examples, the signal 410 "SR_ov" may be filtered by a filter 412 (e.g., a deglitch component, such as a 5-clock deglitch component) to generate a signal 422 "filter_ov" (e.g., a filtered signal). A rising edge detection component 414 may generate the over-voltage transient event signal 316 "trans_ov" based upon the signal 410 "SR_ov" and/or the signal 422 "filter_ov". For example, the rising edge detection component 414 may output a pulse, indicative of occurrence of an over-voltage transient event, in response to (e.g., upon) a rising edge of the signal 410 "SR_ov" and/or the signal 422 "filter_ov".

The signal 426 "above_thr" may indicate whether the voltage error is above the over-voltage threshold (e.g., the signal 426 may be 1 if the voltage error is above the over-voltage threshold and/or may be 0 if the voltage error is not above the over-voltage threshold). The signal 440 "below_fltr" may indicate whether the voltage error is below the under-voltage transient event filtering threshold 314 "fltr_thr_un" (e.g., the signal 440 may be 1 if the voltage error is below the under-voltage transient event filtering threshold 314 "fltr_thr_un" and/or may be 0 if the voltage error is not below the under-voltage transient event filtering threshold 314 "fltr_thr_un").

A logical component 428 (e.g., a SR latch) may generate a signal 430 "SR_un" based upon the signal 426 "above_thr" and the signal 440 "below_fltr".

In some examples, the signal 430 "SR_un" may be filtered by a filter 432 (e.g., a deglitch component, such as a 5-clock deglitch component) to generate a signal 442 "filter_un" (e.g., a filtered signal). A rising edge detection component 434 may generate the under-voltage transient event signal 324 "trans_un" based upon the signal 430 "SR_un" and/or the signal 442 "filter_un". For example, the rising edge detection component 434 may output a pulse, indicative of occurrence of an under-voltage transient event, in response to (e.g., upon) a rising edge of the signal 430 "SR_un" and/or the signal 442 "filter_un".

Figure 5:
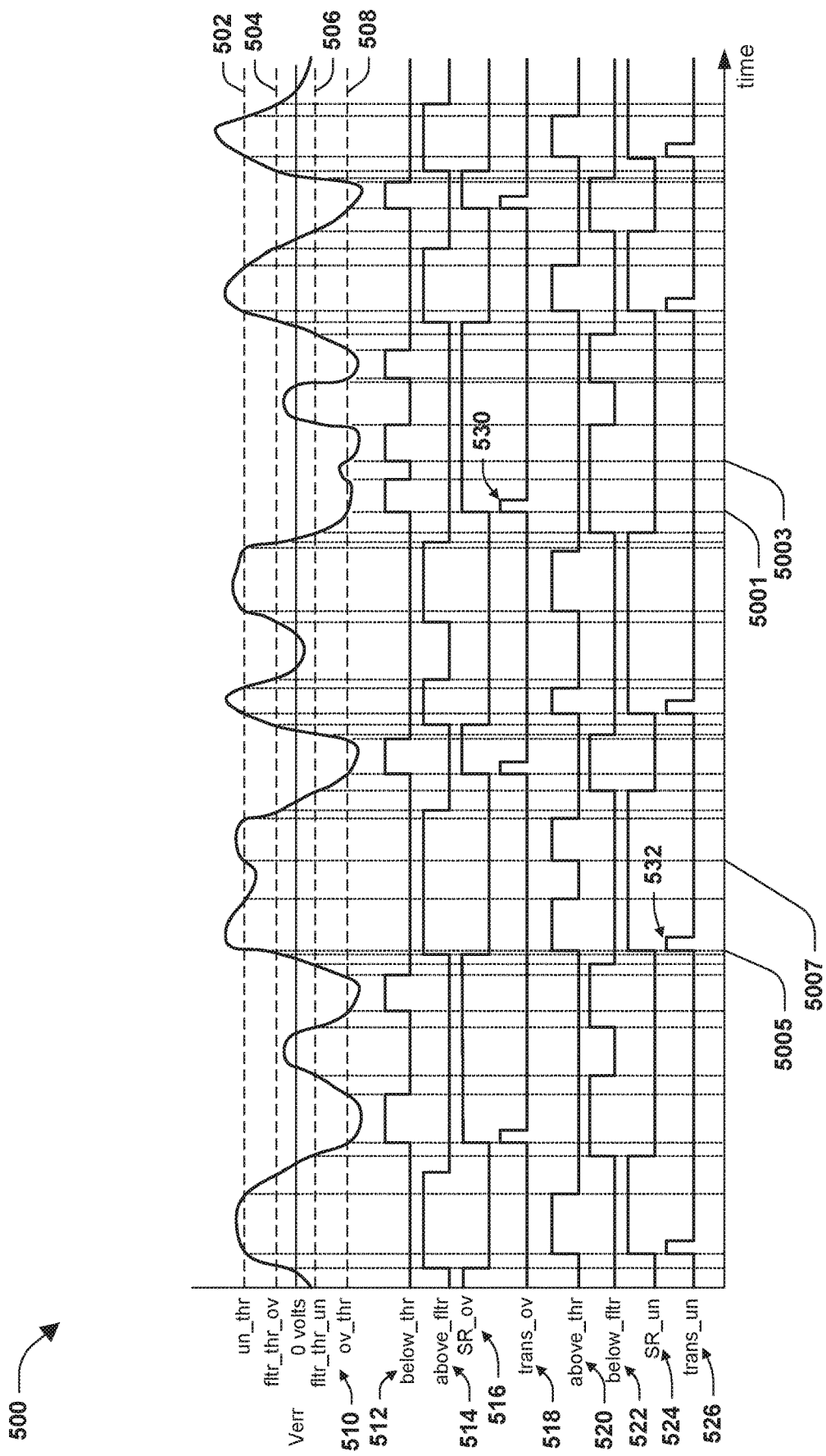
FIG. 5 is an exemplary timing diagram illustrating operation of a transient event detector, according to some embodiments.

FIG. 5 illustrates a timing diagram 500 associated with operation of the first example embodiment of the transient event detector 304, according to some embodiments. The timing diagram 500 comprises a Verr curve 510 indicating voltage levels of the voltage error (indicated by the voltage error signal 216), a below_thr curve 512 indicating values (e.g., 0 and 1) of the signal 406 "below_thr", an above_fltr curve 514 indicating values (e.g., 0 and 1) of the signal 420 "above_fltr", a SR_ov curve 516 indicating values (e.g., 0 and 1) of the signal 410 "SR_ov", a trans_ov curve 518 indicating values (e.g., 0 and 1) of the over-voltage transient event signal 316 "trans_ov", an above_thr curve 520 indicating values (e.g., 0 and 1) of the signal 426 "above_thr", a below_fltr curve 522 indicating values (e.g., 0 and 1) of the signal 440 "below_fltr", a SR_un curve 524 indicating values (e.g., 0 and 1) of the signal 430 "SR_un" and/or a trans_un curve 526 indicating values (e.g., 0 and 1) of the under-voltage transient event signal 324 "trans_un". Dashed lines 502, 504, 506 and 508 are representative of the under-voltage threshold (indicated by the under-voltage threshold signal 332 "un_thr"), the over-voltage transient event filtering threshold 312 "fltr_thr_ov", the under-voltage transient event filtering threshold 314 "fltr_thr_un" and the over-voltage threshold (indicated by the over-voltage threshold signal 338 "ov_thr"), respectively.

As shown in the timing diagram 500, at a first time 5001, upon the voltage error (shown by the Verr curve 510) decreasing to below the over-voltage threshold 508, a pulse 530 is output via the over-voltage transient event signal 316 "trans_ov" indicating occurrence of an over-voltage transient event. However, at a second time 5003, although the voltage error decreases to below the over-voltage threshold 508, a pulse is not output via the over-voltage transient event signal 316 "trans_ov" to indicate occurrence of an over-voltage transient event. For example, the voltage error decreasing to below the over-voltage threshold 508 at the second time 5003 is not considered to be an over-voltage transient event because, between the second time 5003 and the first time 5001 at which the most-recently detected over-voltage transient event occurs, the voltage error does not exceed the over-voltage transient event filtering threshold 312 "fltr_thr_ov".

It may be appreciated that not considering the voltage error decreasing to below the over-voltage threshold 508 at the second time 5003 to be an over-voltage transient event improves accuracy of the transient event detector 304, and thus, improves performance of the apparatus 100, such as due to preventing non-transient events (e.g., steady state events and/or events caused by noise) from being counted as transient events.

As shown in the timing diagram 500, at a third time 5005, upon the voltage error (shown by the Verr curve 510) increasing to above the under-voltage threshold 502, a pulse 532 is output via the under-voltage transient event signal 324 "trans_un" indicating occurrence of an under-voltage transient event. However, at a fourth time 5007, although the voltage error increases to above the under-voltage threshold 502, a pulse is not output via the under-voltage transient event signal 324 "trans_un" to indicate occurrence of an under-voltage transient event. For example, the voltage error increasing to above the under-voltage threshold 502 at the fourth time 5007 is not considered to be an under-voltage transient event because, between the fourth time 5007 and the third time 5005 at which the most-recently detected under-voltage transient event occurs, the voltage error does not decrease to below the under-voltage transient event filtering threshold 314 "fltr_thr_un".

It may be appreciated that not considering the voltage error increasing to above the under-voltage threshold 502 at the fourth time 5007 to be an under-voltage transient event improves accuracy of the transient event detector 304, and thus, improves performance of the apparatus 100, such as due to preventing non-transient events (e.g., steady state events and/or events caused by noise) from being counted as transient events.

Figure 6:
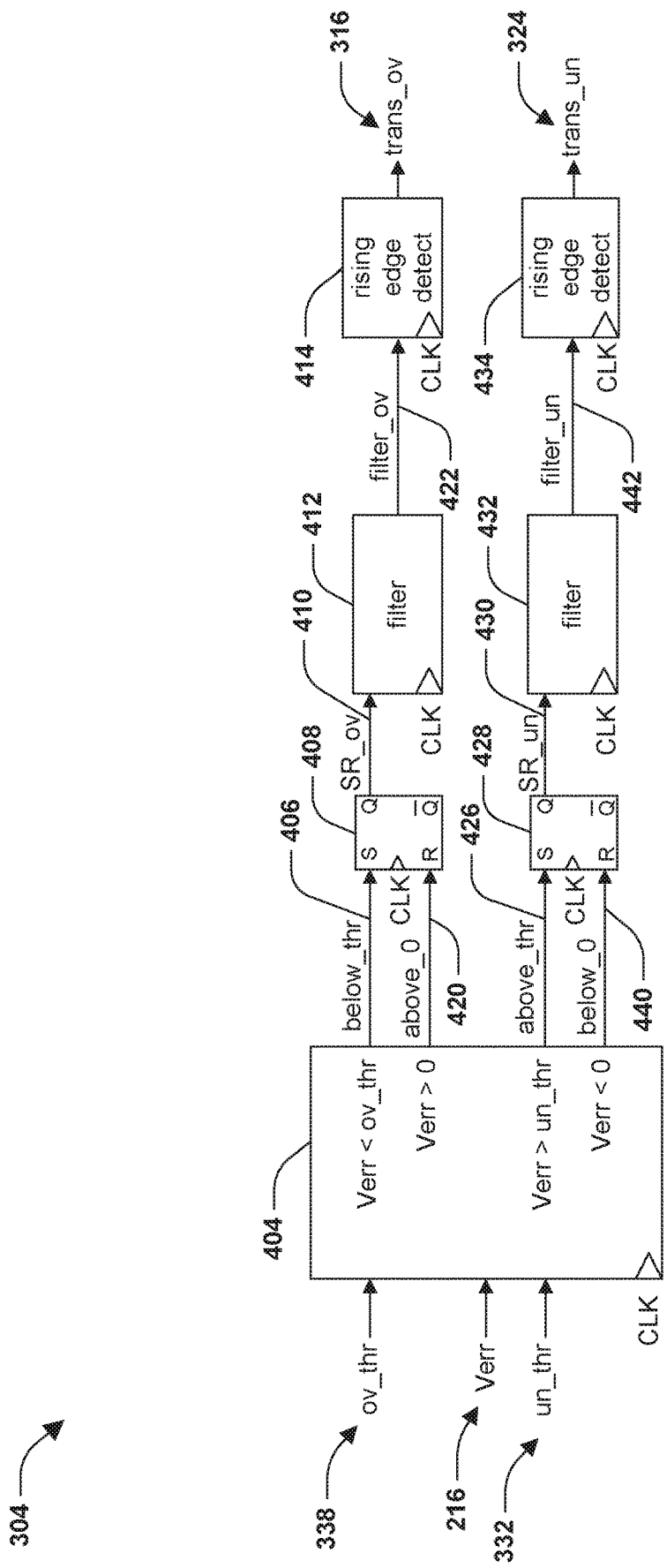
FIG. 6 is a component block diagram illustrating a transient event detector, according to some embodiments.

Embodiments are contemplated in which the transient event detector 304 does not use the over-voltage transient event filtering threshold 312 "fltr_thr_ov" and/or the under-voltage transient event filtering threshold 314 "fltr_thr_un". For example, FIG. 6 illustrates a second example embodiment of the transient event detector 304 in which the transient event detector 304 does not use the over-voltage transient event filtering threshold 312 "fltr_thr_ov" and/or the under-voltage transient event filtering threshold 314 "fltr_thr_un" for detecting transient events and/or outputting the one or more signals.

In the second example embodiment of the transient event detector 304, the signal 420 "above_fltr" may be replaced with a signal 420 "above_0" that indicates whether the voltage error is above 0 volts (e.g., the signal 420 may be 1 if the voltage error is above 0 volts and/or may be 0 if the voltage error is not above 0 volts).

In the second example embodiment of the transient event detector 304, the signal 440 "below_fltr" may be replaced with a signal 440 "below_0" that indicates whether the voltage error is below 0 volts (e.g., the signal 440 may be 1 if the voltage error is below 0 volts and/or may be 0 if the voltage error is not below 0 volts).

Figure 7:
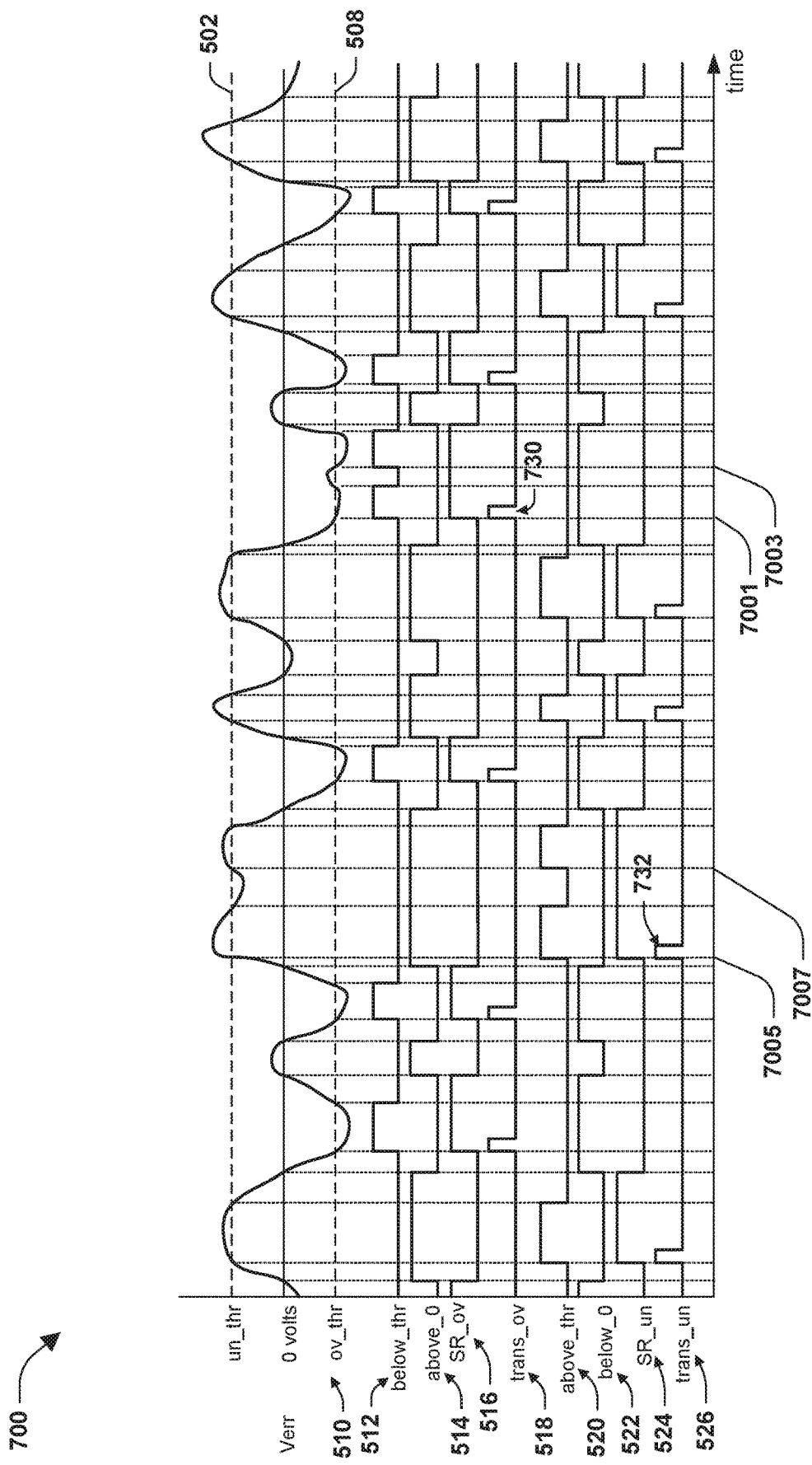
FIG. 7 is an exemplary timing diagram illustrating operation of a transient event detector, according to some embodiments.

FIG. 7 illustrates a timing diagram 700 associated with operation of the second example embodiment of the transient event detector 304, according to some embodiments. The timing diagram 700 comprises curves shown in the timing diagram 500 of FIG. 5. At least some of the curves in the timing diagram 700 differ from corresponding curves in the timing diagram 500 as a result of using 0 volts (rather than the over-voltage transient event filtering threshold 312 "fltr_thr_ov" and/or the under-voltage transient event filtering threshold 314 "fltr_thr_un") for detection of transient events (such as discussed below).

As shown in the timing diagram 700, at a first time 7001, upon the voltage error (shown by the Verr curve 510) decreasing to below the over-voltage threshold 508, a pulse 530 is output via the over-voltage transient event signal 316 "trans_ov" indicating occurrence of an over-voltage transient event. However, at a second time 7003, although the voltage error decreases to below the over-voltage threshold 508, a pulse is not output via the over-voltage transient event signal 316 "trans_ov" to indicate occurrence of an over-voltage transient event. For example, the voltage error decreasing to below the over-voltage threshold 508 at the second time 7003 is not considered to be an over-voltage transient event because, between the second time 7003 and the first time 7001 at which the most-recently detected over-voltage transient event occurs, the voltage error does not exceed 0 volts.

As shown in the timing diagram 700, at a third time 7005, upon the voltage error (shown by the Verr curve 510) increasing to above the under-voltage threshold 502, a pulse 532 is output via the under-voltage transient event signal 324 "trans_un" indicating occurrence of an under-voltage transient event. However, at a fourth time 7007, although the voltage error increases to above the under-voltage threshold 502, a pulse is not output via the under-voltage transient event signal 324 "trans_un" to indicate occurrence of an under-voltage transient event. For example, the voltage error increasing to above the under-voltage threshold 502 at the fourth time 7007 is not considered to be an under-voltage transient event because, between the fourth time 7007 and the third time 7005 at which the most-recently detected under-voltage transient event occurs, the voltage error does not decrease to below 0 volts.

Figure 8A:
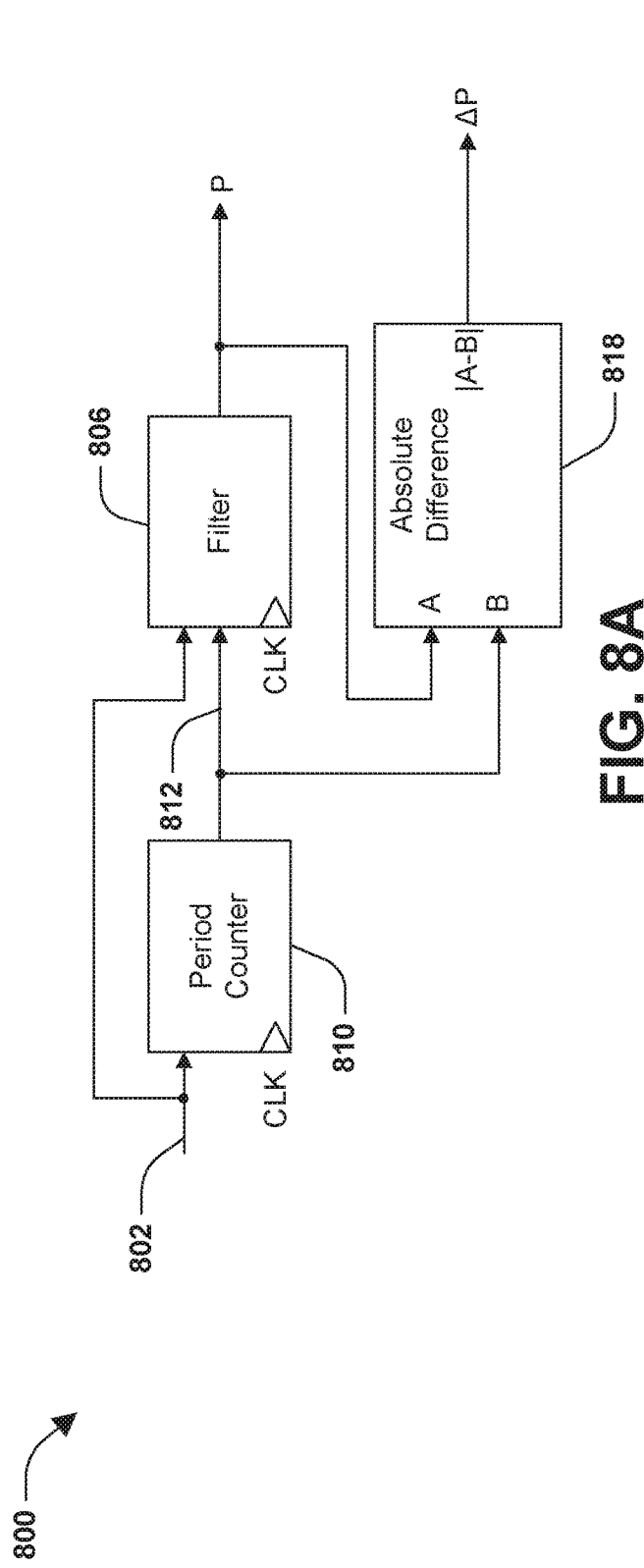
FIG. 8A is a component block diagram illustrating a period detector, according to some embodiments.

FIG. 8A illustrates an example embodiment of a period detector 800 of the one or more period detectors, such as the over-voltage period detector 306 and/or the under-voltage period detector 334. The period detector 800 may comprise a period counter 810. A transient event signal 802 indicative of occurrences of transient events may be input to the period counter 810. In an example in which the period detector 800 is the over-voltage period detector 306, the transient event signal 802 may be the over-voltage transient event signal 316 "trans_ov". In an example in which the period detector 800 is the under-voltage period detector 334, the transient event signal 802 may be the under-voltage transient event signal 324 "trans_un".

In some examples, the period counter 810 may determine a period count 812 (e.g., a period measurement) between two transient events indicated by the transient event signal 802 and output the period count 812 to a filter 806 and/or a difference module 818 (e.g., an absolute difference module). In an example, in response to a first transient event (e.g., detected by detecting a pulse in the transient event signal 802) of the two transient events, the period counter 810 may start (e.g., restart) counting. In response to a second transient event of the two transient events (e.g., the second transient event may be the next transient event after the first transient event), the period counter 810 may output the period count 812 as a counter value of the period counter 810.

In some examples, the filter 806 may be a moving average module. For example, the filter 806 may determine an average of n most recently determined period counts from the period counter 810, and output a filtered period P (e.g., the first filtered period P1 and/or the second filtered period P2) based upon the average. For example, the filtered period P may be equal to the average. In some examples, the filtered period P may be output to the difference module 818. The difference module 818 may determine a difference (e.g., an absolute difference) between the filtered period P and the period count 812 (e.g., the most recently determined period), and output a period difference ΔP (e.g., the first period difference ΔP1 and/or the second period difference ΔP2) based upon the difference. For example, the period difference ΔP may be equal to the difference.

Figure 8B:
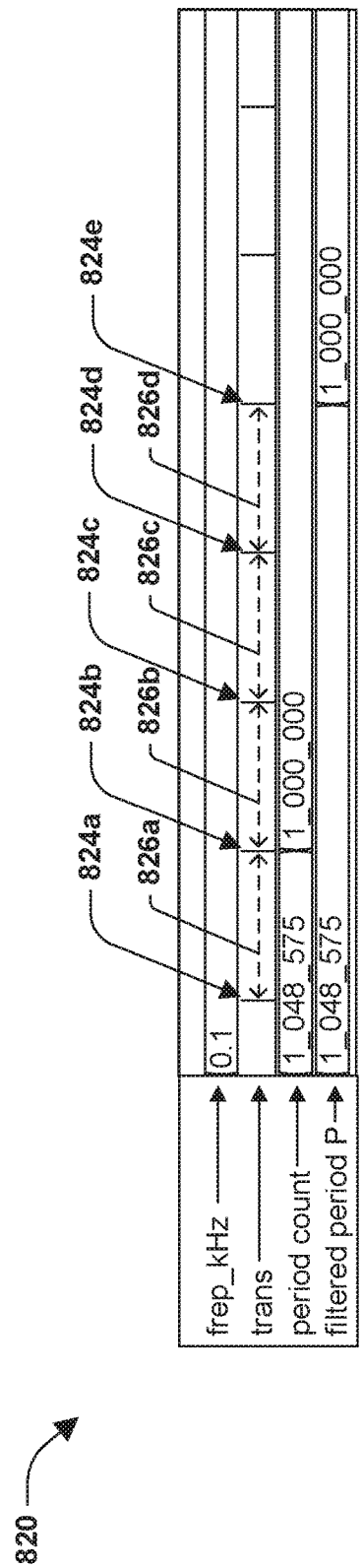

FIGS. 8B-8D illustrate datasets associated with operation of the period detector 800. FIG. 8B illustrates a first dataset 820 associated with operation of the period detector 800. The first dataset 820 is associated with initial detection of transient events, indicated by the transient event signal 802, after the filtered period P is set to the maximum count of the period counter 810 and/or after a period of time in which the filtered period the transient event signal 802 does not indicate a transient event. For example, the period of time may be larger than a duration of time corresponding to the maximum count of the period counter 810 (e.g., the duration of time may be a time it takes for the period counter 810 to count to the maximum count). The first dataset 820 shows a frequency "frep_kHz" (in units of kilohertz, for example) of transient events indicated by the transient event signal 802, pulses 824 (shown as vertical lines) of the transient event signal 802 (e.g., the pulses 824 indicate occurrences of transient events), period count 812 "period count" output by the period counter 810, and filtered period P output by the filter 806. A first pulse 824a may be indicative of a first transient event. The first transient event may be an initial transient event after the filtered period P is set to the maximum count and/or after the period of time in which the transient event signal 802 does not indicate a transient event. At a time of the first pulse 824a, the period count 812 and the filtered period P are equal to the maximum count (e.g., 1_048_575). The period counter 810 determines a first period measurement corresponding to a first transient event period 826a between the first pulse 824b indicative of a second transient event. For example, the period counter 810 starts counting in response to the first pulse 824a. In response to the second pulse 824b, the period counter 810 determines the first period measurement to be a counter value of the period counter 810 (e.g., the first period measurement is 1_000_000), and the period counter 810 the sets the period count 812 to the first period measurement. In some examples, the filter 806 is configured to output an n-sample moving average. In some examples, when the filtered period P is equal to the maximum count, the filter 806 may require that the filter 806 be provided with x period measurements (e.g., x period measurements that are each lower than the maximum count) before the filter 806 sets the filtered period P to a new value (other than the maximum count, for example). For example, after the period count 812 and/or the filtered period P are set to the maximum count, the filter 806 may not set the filtered period P to a new value (other than the maximum count, for example) until the filter 806 is provided with x period measurements (e.g., x period measurements that are each lower than the maximum count). In some examples, x may be equal to n. Alternatively and/or additionally, x may be different than n. In the example shown in FIG. 8B, n may be equal to 4 (e.g., the filter 806 is configured to output a 4-sample moving average) and/or x may be equal to 4. Accordingly, once four period measurements have been measured by the period counter 810 (e.g., the four period measurements may comprise the first period measurement corresponding to the first transient event period 826a between the first pulse 824a and the second pulse 824b, a second period measurement corresponding to a second transient event period 826b between the second pulse 824b and a third pulse 824c, a third period measurement corresponding to a third transient event period 826c between the third pulse 824c and a fourth pulse 824d, and/or a fourth period measurement corresponding to a fourth transient event period 826d between the fourth pulse 824d and a fifth pulse 824e), the filtered period P may be set to an average of the four period measurements. In the example shown in FIG. 8B, each period measurement of the four period measurements is the same (e.g., 1_000_000), and thus, the average of the four period measurements (to which the filtered period P is set) is equal to the four period measurements (e.g., the filtered period P is set to 1_000_000 based upon the four period measurements being 1_000_000). However, embodiments are contemplated in which period measurements differ from each other. By waiting until x period measurements (e.g., four period measurements as shown in FIG. 8B or other quantity of period measurements) are provided before updating the filtered period P when the filtered period P is equal to the maximum count, operation of the period detector 800 (and/or the apparatus 100) is improved as a result of preventing one or more incorrectly detected transient events from affecting the filtered period P, and thus from affecting one or more regulation control parameters that are set to one or more values based upon the filtered period P. In an example, the one or more incorrectly detected transient events may be caused by noise and/or glitches (e.g., noise and/or glitches of the transient event detector 304).

FIG. 8C illustrates a second dataset 840 associated with operation of the period detector 800 associated with a frequency change. The second dataset 840 shows a frequency "frep_kHz" of transient events indicated by the transient event signal 802, pulses (shown as vertical lines) of the transient event signal 802 (e.g., the pulses indicate occurrences of transient events), period count 812 "period count" output by the period counter 810, and filtered period P output by the filter 806. The period count 812 may be set to a first period measurement (e.g., 333_333) corresponding to a first transient event period 846a and may be set to a second period measurement (e.g., the same as the first period measurement) corresponding to a second transient event period 846b (e.g., a period measurement of the first transient event period 846a and a period measurement of the second transient event period 846b are the same). The frequency may change (from 0.3 to 0.5, for example) and the period count 812 may be set to a third period measurement (e.g., 266_667) corresponding to a third transient event period 846c. For example, the period counter 810 may output the third period measurement to the filter 806. The filter 806 may determine an average of n (e.g., 4) most recently determined period measurements, and may update the filtered period P by setting the filtered period P to the average (e.g., 316_666). That is, the filtered period P may be updated upon each determined period measurement from the period counter 810. For example, the filtered period P is updated (e.g., set to 283_333) based upon a fourth period measurement (e.g., 200_000) corresponding to a fourth transient event period 846d, then the filtered period P is updated (e.g., set to 250_000) based upon a fifth period measurement (e.g., 200_000) corresponding to a fifth transient event period 846e, etc.

FIG. 8D illustrates a third dataset 860 associated with operation of the period detector 800. The third dataset 860 is associated with transient events, indicated by the transient event signal 802, stopping at a time 862 (e.g., oscillation of the voltage error stops). For example, transient events may stop at the time 862 for a period of time (e.g., the period of time may be larger than a duration of time corresponding to the maximum count of the period counter 810). For example, transient events may stop at the time 862 due to the load 118 shutting off. The third dataset 860 shows a frequency "frep_kHz" of transient events indicated by the transient event signal 802, pulses (shown as vertical lines) of the transient event signal 802 (e.g., the pulses 824 indicate occurrences of transient events), period count 812 "period count" output by the period counter 810, and filtered period P output by the filter 806. In some examples, as shown in the third dataset 860, the period count 812 increases (e.g., increases exponentially) in response to the time 862 at which transient events stop occurring. For example, in response to the time 862 at which transient events stop occurring, the period count 812 increases (e.g., increases exponentially) until the period count 812 is equal to the maximum count of the period counter 810 (e.g., 1_048_575). In some examples, as shown in the third dataset 860, the filtered period P is set to the maximum count when the period count 812 is set to the maximum count (e.g., the filtered period P is set to the maximum count based upon the period count 812 being set to the maximum count).

Figure 8E:
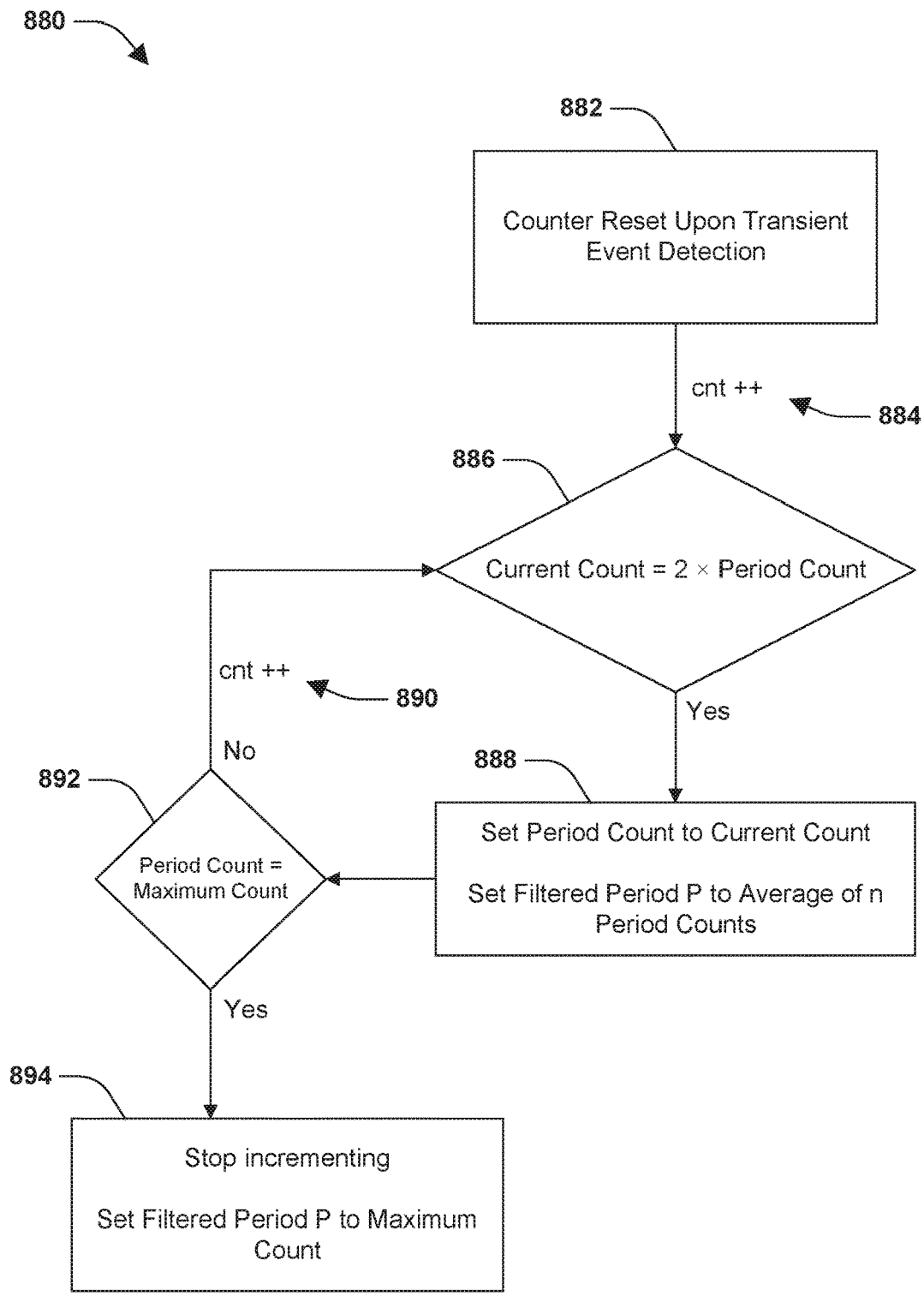
FIG. 8E illustrates a flowchart associated with operation of a period detector, according to some embodiments.

FIG. 8E illustrates a flowchart 880 associated with operation of the period detector 800, such as when transient events indicated by the transient event signal 802 stop occurring for a period of time (e.g., the period of time may be larger than a duration of time corresponding to the maximum count of the period counter 810). In some examples, in response to a detected transient event indicated by the transient event signal 802, the period counter 810 may reset 882 (e.g., period counter 810 may be reset 882 by setting the counter value to 0). In response to resetting 882 the period counter 810, the period counter 810 increments 884 a counter value of the period counter 810 (e.g., increments the counter value based upon a clock signal). In some examples, whether condition 886 is satisfied may be determined. The condition 886 may be satisfied if the counter value (e.g., the current counter value of the period counter 810) is equal to 2 times a most recently determined period measurement (e.g., the most recently determined period measurement may correspond to a period measurement currently indicated by the period count 812 output by the period counter 810). If the condition 886 is satisfied, at 888, the period count 812 output by the period counter 810 is set to the counter value (e.g., the current counter value of the period counter 810 that is equal to 2 times the most recently determined period measurement) and the filtered period P is set to the average of n (e.g., 4) most recently determined period measurements. In response to act 888, whether condition 892 is satisfied may be determined. The condition 892 may be satisfied if the most recently determined period measurement (e.g., a period measurement currently indicated by the period count 812 output by the period counter 810) is equal to the maximum count of the period counter 810. If the condition 892 is not satisfied, the period counter 810 may continue incrementing 890 the counter value of the period counter 810. If the condition 892 is satisfied, at 894, the period counter 810 may stop incrementing the counter value of the period counter 810, and the filtered period P may be set to the maximum count of the period counter 810.

Figure 9:
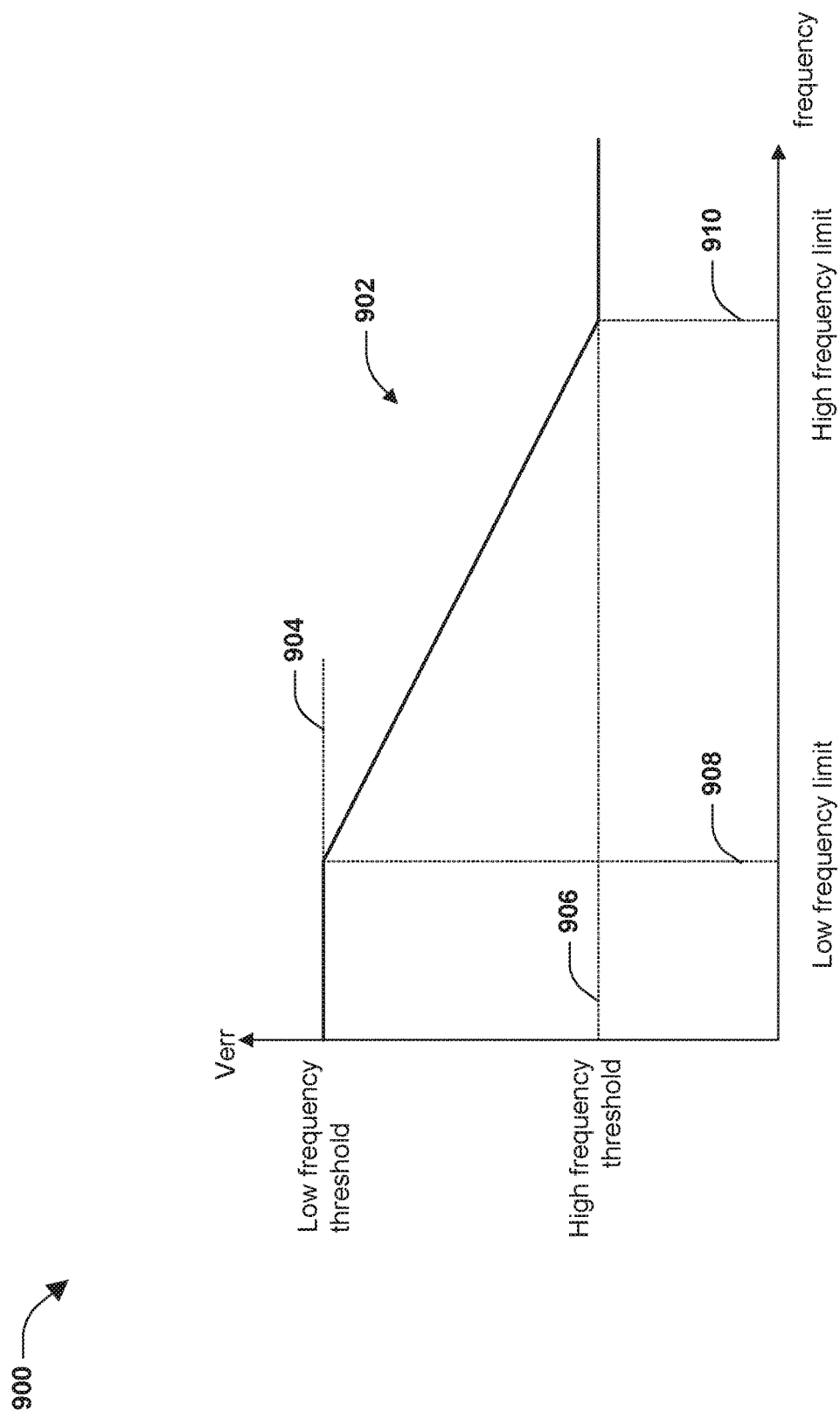
FIG. 9 is a chart associated with operation of a threshold interpolator, according to some embodiments.

FIG. 9 illustrates a chart 900 associated with operation of the threshold interpolator 340 configured to generate the over-voltage threshold signal 338 "ov_thr" and/or the under-voltage threshold signal 332 "un_thr". In some examples, a threshold curve 902 of the chart 900 shows possible threshold values of a threshold (e.g., the over-voltage threshold and/or the under-voltage threshold). In some examples, a horizontal axis of the chart 900 corresponds to frequencies and a vertical axis of the chart 900 corresponds to threshold voltage error values. The threshold curve 902 may be based upon a low frequency threshold 904, a high frequency threshold 906, a low frequency limit 908 and/or a high frequency limit 910. The threshold curve 902 may be representative of a function used to determine the threshold. In an example in which the threshold is the over-voltage threshold, the low frequency threshold 904 may be the over-voltage low frequency threshold 350, the high frequency threshold 906 may be the over-voltage high frequency threshold 348, the low frequency limit 908 may be the low frequency limit 358, and the high frequency limit 910 may be the high frequency limit 346. In an example in which the threshold is the under-voltage threshold, the low frequency threshold 904 may be the under-voltage low frequency threshold 354, the high frequency threshold 906 may be the under-voltage high frequency threshold 352, the low frequency limit 908 may be the low frequency limit 358, and the high frequency limit 910 may be the high frequency limit 346.

As shown in the chart 900, if the frequency indicated by the frequency signal 356 is lower than the low frequency limit 908, the threshold may be set to the low frequency threshold 904.

Alternatively and/or additionally, if the frequency indicated by the frequency signal 356 is between the low frequency limit 908 and the high frequency limit 910, the threshold may be set to a value between the low frequency threshold 904 and the high frequency threshold 906. For example, the threshold may be set to:

$$\text{threshold} = low_{threshold} - (low_{threshold} - high_{threshold}) \times \frac{freq - low_{freq}}{high_{freq} - low_{freq}}$$

where $low_{threshold}$ corresponds to the low frequency threshold 904, $high_{threshold}$ corresponds to the high frequency threshold 906, freq corresponds to the frequency indicated by the frequency signal 356, $low_{freq}$ corresponds to the low frequency limit 908 and/or $high_{freq}$ corresponds to the high frequency limit 910.

Alternatively and/or additionally, if the frequency indicated by the frequency signal 356 is higher than the high frequency limit 910, the threshold value may be set to the high frequency threshold 906.

It may be appreciated that modifying (e.g., dynamically adjusting) the threshold (e.g., the over-voltage threshold and/or the under-voltage threshold) based upon the frequency indicated by the frequency signal 356 may result in improved performance and accuracy of the period detection system 124. For example, changes in the frequency may be associated with (e.g., may cause) changes in an amplitude of one or more signals of the apparatus 100 (e.g., the signal 126, such as the voltage error signal 216 and/or the output current signal 256) based upon which transient events are detected and transient event periods are determined. In an example, as the frequency increases, an amplitude of the signal 126 (e.g., the voltage error signal 216 and/or the output current signal 256) may decrease. Accordingly, in response to an increase of the frequency, the threshold may be adapted to detect lower amplitude transient events using the signal 126. Adjusting the threshold (based upon which transient events are detected) results in more accurately detecting transient events using the one or more signals, and thus, more accurately determining transient event periods, whereby the more accurately determined transient event periods provide for more accurately controlling the one or more regulation control parameters 106 and improved operation of the control engine 104, the regulated power converter 110 and/or the load 118.

In some examples, the one or more regulation control parameters 106 may be controlled and/or adjusted by the parameter control system 102 based upon the transient event period information 114, wherein the transient event period information 114 may be indicative of a period (e.g., a transient oscillation period, such as the period indicated by the period signal 320) and/or a frequency (e.g., a transient oscillation frequency, such as the frequency indicated by the frequency signal 356). For example, the parameter control system 102 may modulate the one or more regulation control parameters 106 as a function of the period and/or the frequency. In some examples, the parameter control system 102 may modulate the one or more regulation control parameters 106 (based upon the period and/or the frequency) using hardware (e.g., dedicated hardware) of the parameter control system 102, a processor (e.g., a CPU) of the parameter control system 102 and/or firmware (e.g., firmware on the processor) of the parameter control system 102.

In an example, a first regulation control parameter of the one or more regulation control parameters 106 may be controlled based upon the transient event period information 114, such as based upon the period and/or the frequency. The parameter control system 102 may modulate the first regulation control parameter as a function of the period and/or the frequency. In an example, one or more operations (e.g., mathematical operations) may be performed using the period and/or the frequency to generate (e.g., update) the first regulation control parameter (e.g., the one or more operations may be performed using the period and/or the frequency to determine a regulation control parameter value, wherein the first regulation control parameter may be set to the regulation control parameter value). For example, the one or more operations may comprise combining (according to a function, for example) the period and/or the frequency with one or more values to generate (e.g., update) the first regulation control parameter (e.g., the period and/or the frequency may be combined with the one or more values to determine a regulation control parameter value, wherein the first regulation control parameter may be set to the regulation control parameter value). In an example, the regulation control parameter value (to which the first regulation control parameter is set) may be determined by at least one of multiplying and/or dividing the period and/or the frequency by a value of the one or more values, adding a value of the one or more values to the period and/or the frequency, subtracting a value of the one or more values from the period and/or the frequency, etc. Alternatively and/or additionally, the parameter control system 102 may comprise a look-up table of regulation control parameter values and/or may set the first regulation control parameter to a regulation control parameter value in the look-up table. For example, the parameter control system 102 may set the first regulation control parameter to the regulation control parameter value based upon an indication (in the look-up table, for example) that the regulation control parameter value is associated with the period and/or the frequency.

Figure 10:
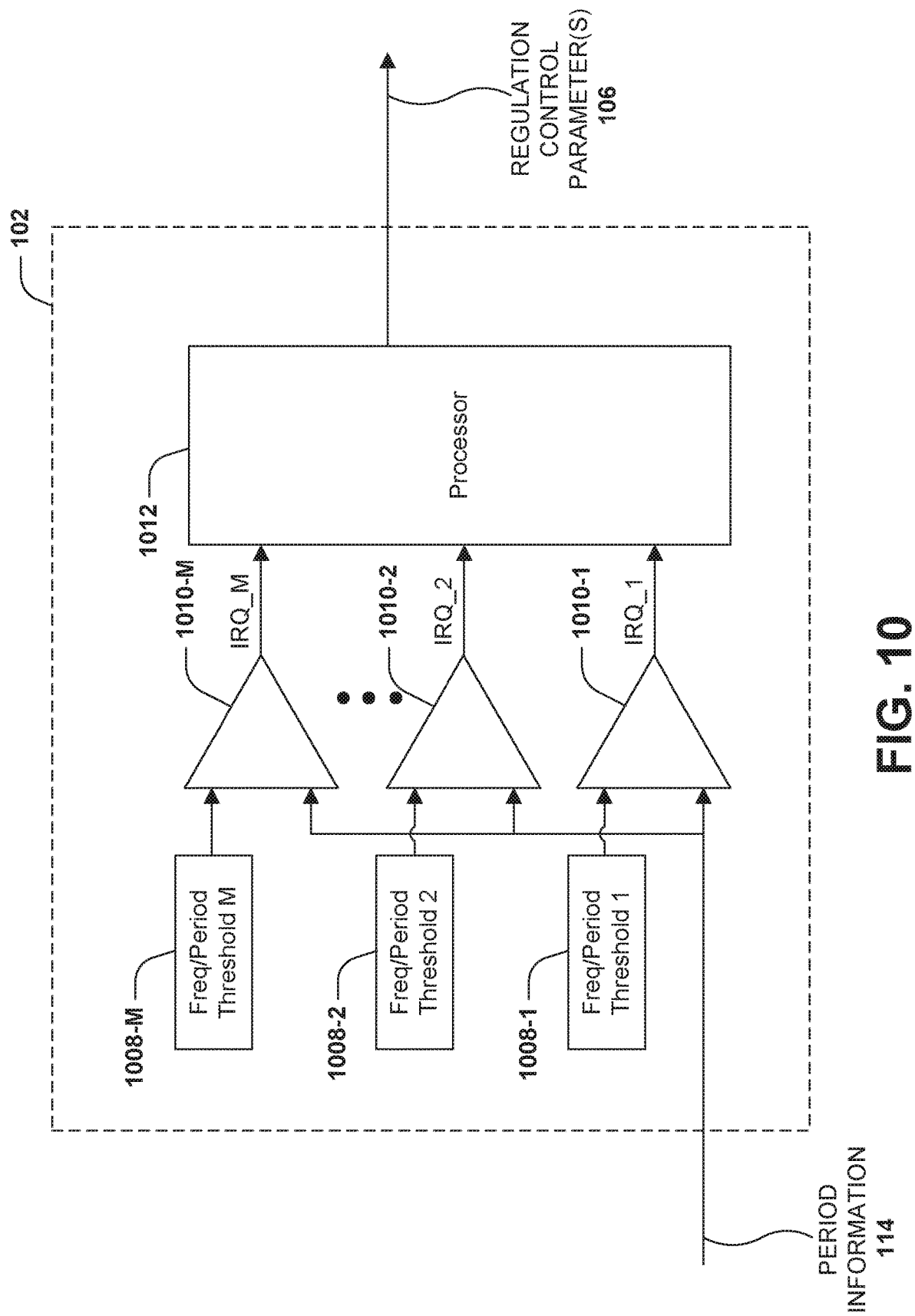
FIG. 10 is a component block diagram illustrating a parameter control system, according to some embodiments.

FIG. 10 illustrates an example embodiment of the parameter control system 102. In some examples, the transient event period information 114 may be input to a set of comparators 1010 (e.g., an array of comparators), such as digital comparators. The period and/or the frequency indicated by the transient event period information 114 may be compared with a set of thresholds 1008 (e.g., defined thresholds, such as programmed thresholds) using the set of comparators 1010. In some examples, the set of comparators 1010 may comprise M comparators and/or the set of thresholds 1008 may comprise M thresholds. In an example, a threshold of the set of thresholds 1008 may comprise a frequency threshold (with which the frequency indicated by the transient event period information 114 is compared, for example). Alternatively and/or additionally, a threshold of the set of threshold 1008 may comprise a period threshold (with which the period indicated by the transient event period information 114 is compared, for example). In some examples, the set of comparators 1010 may indicate, to a processor 1012 (e.g., a CPU) of the parameter control system 102, one or more thresholds (of the set of threshold 1008) that the frequency and/or the period indicated by the transient event period information 114 are larger than or smaller than. For example, the processor 1012 may determine, based upon outputs of the set of comparators 1010, that the frequency and/or the period is within a range (e.g., a range of frequencies and/or a range of periods). In an example, the range may range from a first value corresponding to a first threshold of the set of thresholds 1008 to a second value corresponding to a second threshold of the set of thresholds 1008 (e.g., the frequency and/or the period exceed the first threshold and/or the frequency and/or the period do not exceed the second threshold). The processor 1012 may control (e.g., modify) the one or more regulation control parameters 106 based upon the range. For example, the processor 1012 may determine a regulation control parameter value based upon the range, and set the first regulation control parameter to the regulation control parameter value. In an example, the set of comparators 1010 may output, to the processor 1012, one or more interrupt requests (IRQs) indicative of the range. In response to the one or more IRQs, the processor 1012 may modify (e.g., adjust and/or tune) the one or more regulation control parameters 106 based upon the range (e.g., the processor 1012 may interrupt a processor routine of the processor 1012 to modify the one or more regulation control parameters 106 based upon the range).

Figure 11:
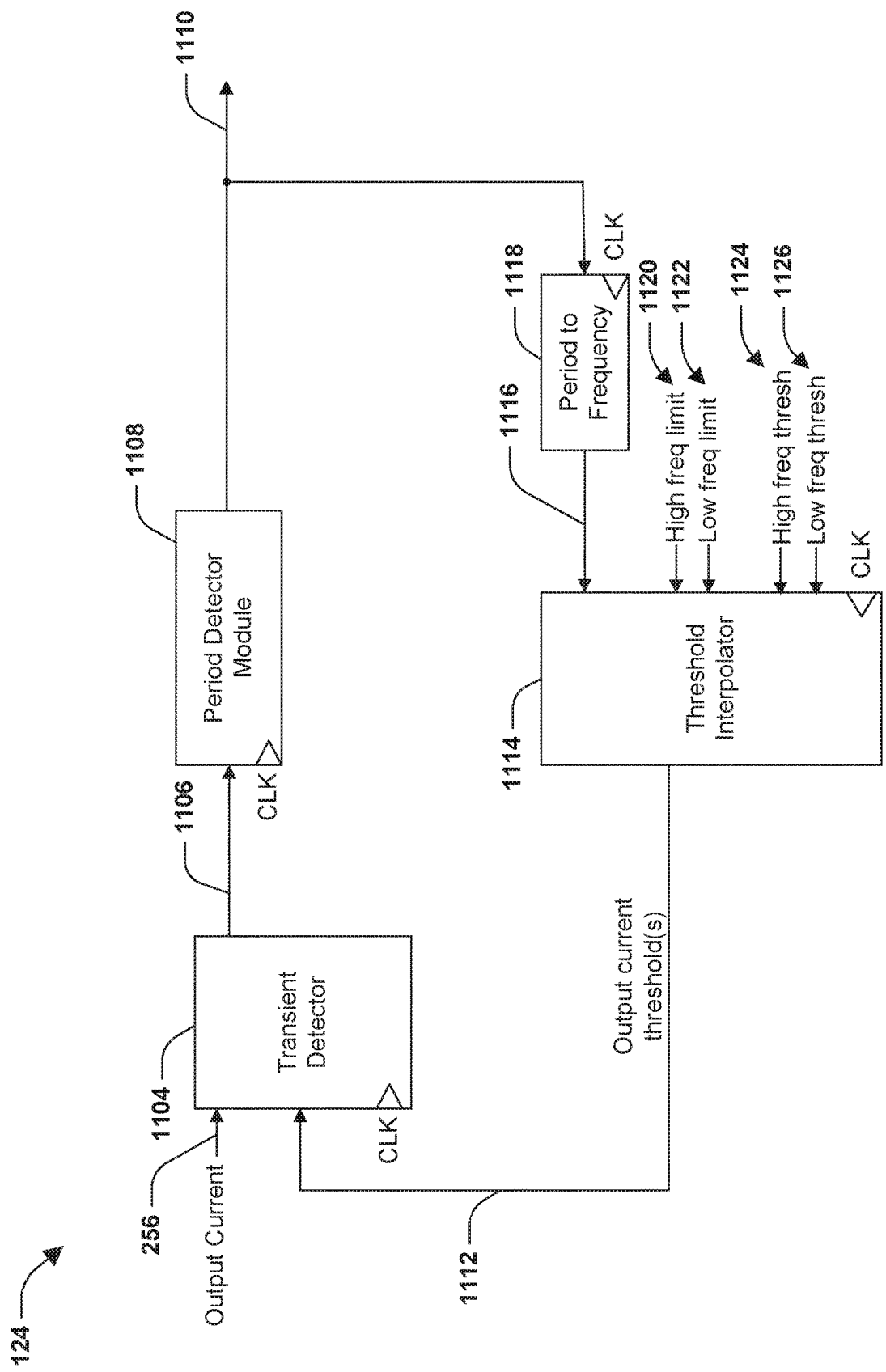
FIG. 11 is a component block diagram illustrating a period detection system, according to some embodiments.

FIG. 11 illustrates the period detection system 124 according to some embodiments. In the embodiment shown in FIG. 11, the signal 126 comprises the output current signal 256 indicative of the output current at the output 112 (e.g., the output current may correspond to load current supplied to the load). Embodiments are contemplated in which the signal 126 comprises a signal other than the output current signal 256, such as at least one of the voltage error signal 216, a signal that is based upon the voltage error (e.g., the signal may be indicative of a value that is a function of the voltage error), a signal indicative of a slope of the voltage error, a signal that is based upon the output current (e.g., the signal may be indicative of a value that is a function of the output current), a signal indicative of a slope of the output current, a current control signal (e.g., used in current mode control scheme), a current error signal (e.g., used in current mode control scheme), etc.

The period detection system 124 may comprise a transient event detector 1104 configured to detect transient events (e.g., under-voltage transient events and/or over-voltage transient events) at the output 112. The transient event detector 1104 may output one or more signals 1106 indicative of occurrence of transient events. For example, the one or more signals 1106 may comprise an over-voltage transient event signal indicative of occurrences of over-voltage transient events and/or an under-voltage transient event signal indicative of occurrences of under-voltage transient events. In some examples, the transient event detector 1104 may monitor the output current signal 256 to detect transient events, wherein the transient events may comprise the under-voltage transient events (e.g., load step transient events) and/or the over-voltage transient events (e.g., load release transient events). The transient event detector 1104 may detect transient events and/or output the one or more signals 1106 based upon an over-voltage current threshold and/or an under-voltage current threshold. The over-voltage current threshold and/or the under-voltage current threshold may be indicated by one or more threshold signals 1112 provided to the transient detector 1104. In some examples, the over-voltage current threshold and/or the under-voltage current threshold may be determined based upon the output current signal 256. For example, an average output current may be determined based upon current values of the output current signal 256 over a period of time. The over-voltage current threshold may be determined based upon the average output current and/or based upon a period (e.g., a transient oscillation period, such as a period indicated by a period signal 1110) and/or a frequency (e.g., a transient oscillation frequency, such as a frequency indicated by a frequency signal 1116). In some examples, the over-voltage current threshold may be below the average output current and/or the under-voltage current threshold may be above the average output current. An over-voltage transient event may be detected based upon a determination that the output current (indicated by the output current signal 256) decreases to lower than the over-voltage current threshold. An under-voltage transient event may be detected based upon a determination that the output current increases to above the under-voltage current threshold. In some examples, the over-voltage current threshold and/or the under-voltage current threshold may be updated periodically and/or continuously (e.g., based upon determined average output current values and/or determined frequencies and/or periods). Alternatively and/or additionally, the transient event detector 1104 may detect transient events and/or output the one or more signals 1106 based upon an over-voltage transient event filtering threshold and/or an under-voltage transient event filtering threshold. The transient event detector 1104 may detect the transient events and/or output the one or more signals 1106 (based upon the output current signal 256) using one or more of the techniques provided herein with respect to FIGS. 3-7 for detecting transient events and/or outputting the over-voltage transient event signal 316 "trans_ov" and/or the under-voltage transient event signal 324 "trans_un".

In some examples, the period detection system 124 comprise a period detector module 1108 configured to output a period signal 1110 based upon the one or more signals 1106. For example, the period detector module 1108 may comprise one or more period detectors (e.g., an under-voltage period detector 334 and/or an over-voltage period detector 306), a component 310 and/or a comparator 328, such as a digital comparator. The period signal 1110 may be indicative of a period (e.g., a selected filtered period determined using the period detector module 1108). In some examples, the period detector module 1108 may generate the period signal 1110 using one or more of the techniques provided herein with respect to FIGS. 3 and 8A-8E for generating the period signal 320.

In some examples, the over-voltage threshold and/or the under-voltage threshold may be dynamically adjusted based upon the selected filtered period (indicated by the period signal 1110). In an example, the period signal 1110 may be input to a period to frequency component 1118. The period to frequency component 1118 may generate a frequency signal 1116 based upon the period signal 1110. The frequency signal 1116 may be input to a threshold interpolator 1114 configured to generate the one or more threshold signals 1112 based upon the frequency signal 1116. Alternatively and/or additionally, the threshold interpolator 1114 may generate the one or more threshold signals 1112 based upon a high frequency limit 1120, a low frequency limit 1122, one or more high frequency thresholds 1124 (e.g., an over-voltage high frequency threshold and/or an under-voltage high frequency threshold) and/or one or more low frequency thresholds 1126 (e.g., an over-voltage high frequency threshold and/or an under-voltage high frequency threshold). In some examples, the threshold interpolator 1114 may generate the one or more threshold signals 1112 (and/or may determine the over-voltage threshold and/or the under-voltage threshold) using one or more of the techniques provided herein with respect to FIGS. 3 and 9 for generating the over-voltage threshold signal 338 "ov_thr" and/or the under-voltage threshold signal 332 "un_thr".

In some examples, one, some and/or all components of the apparatus 100, such as one, some and/or all components of the period detection system 124, may operate according to a clock signal (shown as "CLK" in FIGS. 3-4, 6, 8A, and 11). The clock signal CLK may be generated by a clock generator (e.g., a clock generator of the period detection system 124).

Figure 12:
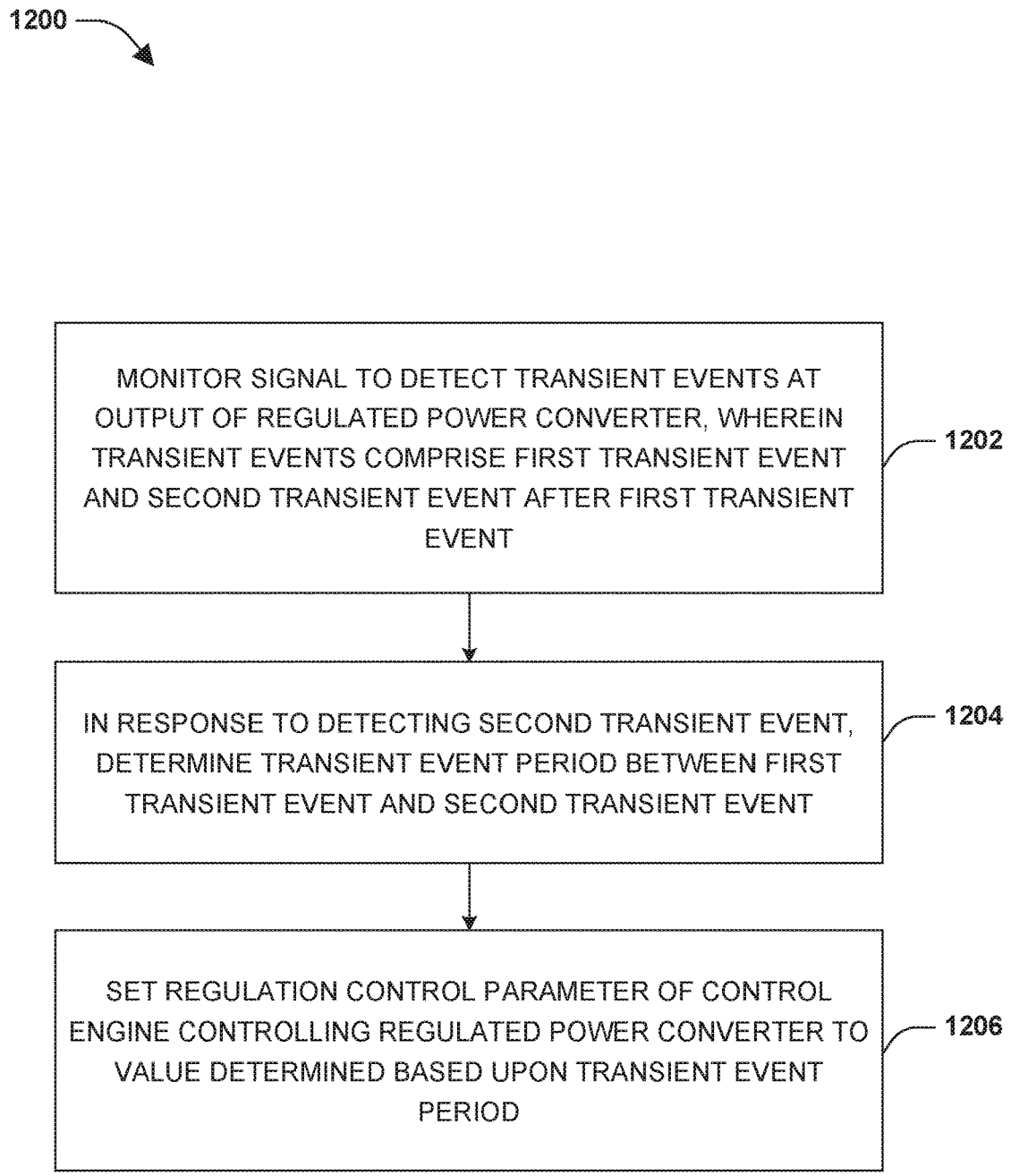
FIG. 12 is an illustration of an example method, according to some embodiments.

FIG. 12 is an illustration of a method 1200, according to some embodiments. At 1202, a signal is monitored to detect transient events at an output (e.g., the output 112 illustrated in FIGS. 1-2) of a regulated power converter (e.g., the regulated power converter 110 illustrated in FIGS. 1-2). The transient events comprise a first transient event and a second transient event after the first transient event. At 1204, in response to detecting the second transient event, a transient event period between the first transient event and the second transient event is determined. At 1206, a regulation control parameter of a control engine (e.g., the control engine 104 illustrated in FIGS. 1-2) controlling the regulated power converter is set to a value determined based upon the transient event period. For example, the control engine may control the regulated power converter based upon the regulation control parameter.

In some embodiments, the transient events comprise a third transient event before the first transient event. In response to detecting the first transient event, a second transient event period between the third transient event and the first transient event may be determined. A filtered transient event period (e.g., a first filtered period P1, a second filtered period P2, a selected filtered period indicated by the period signal 320, and/or a selected filtered period indicated by the period signal 1110) may be determined based upon the transient event period and the second transient event period (and/or one or more other transient event periods). The regulated power converter may be set to the value based upon the filtered transient event period. For example, the value may be determined based upon the filtered transient event period.

In some embodiments, the first transient event, the second transient event and the third transient event are a first type of transient event. The transient events comprise a fourth transient event, a fifth transient event and a sixth transient event. The fourth transient event, the fifth transient event and the sixth transient event are a second type of transient event. A third transient event period between the fourth transient event and the fifth transient event may be determined. A fourth transient event period between the fifth transient event and the sixth transient event may be determined. A second filtered transient event period may be determined based upon the third transient event period and the fourth transient event period. A first difference (e.g., the first period difference ΔP1 or the second period difference ΔP2) between the filtered transient event period and the transient event period may be determined. A second difference (e.g., the first period difference ΔP1 or the second period difference ΔP2) between the second filtered transient event period and the fourth transient event period may be determined. The filtered transient event period may be selected, form among the filtered transient event period and the second filtered transient event period, based upon a determination that the first difference is smaller than the second difference. The regulation control parameter is set to the value is based upon the filtered transient event period in response to the selecting the filtered transient event period. For example, the value may be determined based upon the filtered transient event period in response to the selecting the filtered transient event period.

In some embodiments, the first type of transient event corresponds to under-voltage events at the output of the regulated power converter and the second type of transient event corresponds to over-voltage events at the output of the regulated power converter. Alternatively and/or additionally, the first type of transient event corresponds to over-voltage events at the output of the regulated power converter and the second type of transient event corresponds to under-voltage events at the output of the regulated power converter.

In some embodiments, the signal is indicative of a voltage error corresponding to a difference between a target voltage of the regulated power converter and an output voltage of the regulated power converter. The transient events may comprise under-voltage events at the output of the regulated power converter. An under-voltage event of the under-voltage events corresponds to the voltage error crossing a first threshold voltage error, such as the voltage error increasing to above the first threshold voltage error or the voltage error decreasing to below the first threshold voltage error. Alternatively and/or additionally, the transient events may comprise over-voltage events at the output of the regulated power converter. An over-voltage event of the over-voltage events corresponds to the voltage error crossing a second threshold voltage error, such as the voltage error decreasing to below the second threshold voltage error or the voltage error increasing to above the second threshold voltage error.

In some embodiments, the first threshold voltage error and/or the second threshold voltage error are modified based upon the transient event period.

In some embodiments, the signal is indicative of an output current of the regulated power converter.

In some embodiments, the regulation parameter is a non-linear gain parameter of the control engine, a PID compensator gain parameter of a PID controller of the control engine, an AVP droop level of an AVP controller (e.g., the AVP controller 248 illustrated in FIG. 2) of the control engine, an AVP bandwidth of an AVP filtering module (e.g., the AVP filtering module 242 illustrated in FIG. 2) of the control engine, an output voltage offset, an inductor current synthesis parameter of a current monitor (e.g., the current monitor 258 illustrated in FIG. 2) of the control engine, or a current balance parameter of the control engine.

In some embodiments, determination of the transient event period comprises starting a counter (e.g., the period counter 810 in FIG. 8A) in response to detecting the first transient event, and in response to detecting the second transient event, determining the transient event period based upon a counter value of the counter.

An embodiment of the presently disclosed techniques includes a method. The method includes monitoring a signal to detect transient events at an output of a regulated power converter, wherein the transient events include a first transient event and a second transient event after the first transient event; in response to detecting the second transient event, determining a transient event period between the first transient event and the second transient event; and setting a regulation control parameter of a control engine controlling the regulated power converter to a value determined based upon the transient event period.

According to some embodiments, the transient events include a third transient event before the first transient event, wherein the method includes in response to detecting the first transient event, determining a second transient event period between the third transient event and the first transient event; and determining, based upon the transient event period and the second transient event period, a filtered transient event period, wherein the value is determined based upon the filtered transient event period.

According to some embodiments, the first transient event, the second transient event and the third transient event are a first type of transient event; the transient events include a fourth transient event, a fifth transient event and a sixth transient event; and the fourth transient event, the fifth transient event and the sixth transient event are a second type of transient event. The method includes determining a third transient event period between the fourth transient event and the fifth transient event; determining a fourth transient event period between the fifth transient event and the sixth transient event; determining a second filtered transient event period based upon the third transient event period and the fourth transient event period; determining a first difference between the filtered transient event period and the transient event period; determining a second difference between the second filtered transient event period and the fourth transient event period; and selecting the filtered transient event period, from among the filtered transient event period and the second filtered transient event period, based upon a determination that the first difference is smaller than the second difference, wherein the value is determined based upon the filtered transient event period in response to the selecting the filtered transient event period.

According to some embodiments, the first type of transient event corresponds to under-voltage events at the output of the regulated power converter and the second type of transient event corresponds to over-voltage events at the output of the regulated power converter; or the first type of transient event corresponds to over-voltage events at the output of the regulated power converter and the second type of transient event corresponds to under-voltage events at the output of the regulated power converter.

According to some embodiments, the signal is indicative of a voltage error corresponding to a difference between a target voltage of the regulated power converter and an output voltage of the regulated power converter; and the transient events include under-voltage events at the output of the regulated power converter, wherein an under-voltage event of the under-voltage events corresponds to the voltage error crossing a first threshold voltage error; and/or the transient events include over-voltage events at the output of the regulated power converter, wherein an over-voltage event of the over-voltage events corresponds to the voltage error crossing a second threshold voltage error.

According to some embodiments, the method includes modifying the first threshold voltage error and/or the second threshold voltage error based upon the transient event period.

According to some embodiments, the signal is indicative of an output current of the regulated power converter.

According to some embodiments, the regulation control parameter is a non-linear gain parameter of the control engine; a PID compensator gain parameter of a PID controller of the control engine; an AVP droop level of an AVP controller of the control engine; an AVP bandwidth of an AVP filtering module of the control engine; an output voltage offset; an inductor current synthesis parameter of a current monitor of the control engine; or a current balance parameter of the control engine.

According to some embodiments, the determining the transient event period includes: starting a counter in response to detecting the first transient event; and in response to detecting the second transient event, determining the transient event period based upon a counter value of the counter.

An embodiment of the presently disclosed techniques includes an apparatus. The apparatus includes a means for monitoring a signal to detect transient events at an output of a regulated power converter, wherein the transient events include a first transient event and a second transient event after the first transient event; a means for, in response to detecting the second transient event, determining a transient event period between the first transient event and the second transient event; and a means for setting a regulation control parameter of a control engine controlling the regulated power converter to a value determined based upon the transient event period.

An embodiment of the presently disclosed techniques includes an apparatus. The apparatus includes a regulated power converter; a control engine configured to control the regulated power converter based upon a regulation control parameter; a period detection system configured to: monitor a signal to detect transient events at an output of the regulated power converter, wherein the transient events include a first transient event and a second transient event after the first transient event; in response to the second transient event, determine a transient event period between the first transient event and the second transient event; and determine transient event period information based upon the transient event period; and a parameter control system configured to set the regulation control parameter to a value determined based upon the transient event period information.

According to some embodiments, the control engine is configured to output, based upon the regulation control parameter, a set of pulse width modulation (PWM) signals to the regulated power converter; and an output voltage of the regulated power converter and/or an output current of the regulated power converter are based upon the set of PWM signals.

According to some embodiments, the control engine is a multi-phase buck control engine; and each PWM signal of the set of PWM signals is associated with a phase of a set of phases associated with the multi-phase buck control engine.

According to some embodiments, the control engine is configured to output the set of PWM signals based upon: a target voltage associated with the output of the regulated power converter; and the output voltage and/or the output current.

According to some embodiments, the transient events include a third transient event before the first transient event; and the period detection system is configured to: in response to the first transient event, determine a second transient event period between the third transient event and the first transient event; and determine, based upon the transient event period and the second transient event period, a filtered transient event period, wherein the transient event period information is based upon the filtered transient event period.

According to some embodiments, the first transient event, the second transient event and the third transient event are a first type of transient event; the transient events include a fourth transient event, a fifth transient event and a sixth transient event; and the fourth transient event, the fifth transient event and the sixth transient event are a second type of transient event. The period detection system is configured to: determine a third transient event period between the fourth transient event and the fifth transient event; determine a fourth transient event period between the fifth transient event and the sixth transient event; determine a second filtered transient event period based upon the third transient event period and the fourth transient event period; determine a first difference between the filtered transient event period and the transient event period; determine a second difference between the second filtered transient event period and the fourth transient event period; and select the filtered transient event period, from among the filtered transient event period and the second filtered transient event period, for use in determining the transient event period information, based upon a determination that the first difference is smaller than the second difference.

According to some embodiments, the first type of transient event corresponds to under-voltage events at the output of the regulated power converter and the second type of transient event corresponds to over-voltage events at the output of the regulated power converter; or the first type of transient event corresponds to over-voltage events at the output of the regulated power converter and the second type of transient event corresponds to under-voltage events at the output of the regulated power converter.

According to some embodiments, the signal is indicative of a voltage error corresponding to a difference between a target voltage of the regulated power converter and an output voltage of the regulated power converter; and the transient events include: under-voltage events at the output of the regulated power converter, wherein an under-voltage event of the under-voltage events corresponds to the voltage error crossing a first threshold voltage error; and/or over-voltage events at the output of the regulated power converter, wherein an over-voltage event of the over-voltage events corresponds to the voltage error crossing a second threshold voltage error.

According to some embodiments, the period detection system is configured to modify the first threshold voltage error and/or the second threshold voltage error based upon the transient event period.

According to some embodiments, the signal is indicative of an output current of the regulated power converter.

According to some embodiments, the period detection system includes a counter. The period detection system is configured to: start the counter in response to the first transient event; and in response to the second transient event, determine the transient event period based upon a counter value of the counter.

An embodiment of the presently disclosed techniques includes an apparatus. The apparatus includes a circuit board; a regulated power converter operatively coupled to the circuit board; a control engine operatively coupled to the circuit board, wherein the control engine is configured to control the regulated power converter based upon a regulation control parameter; a period detection system operatively coupled to the circuit board, wherein the period detection system is configured to: monitor a signal to detect transient events at an output of the regulated power converter, wherein the transient events include a first transient event and a second transient event after the first transient event; in response to the second transient event, determine a transient event period between the first transient event and the second transient event; and determine transient event period information based upon the transient event period; and a parameter control system operatively coupled to the circuit board, wherein the parameter control system is configured to set the regulation control parameter to a value determined based upon the transient event period information.

According to some embodiments, the output of the regulated power converter is connected to a load operatively coupled to the circuit board.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

While the subject matter has been described with reference to illustrative embodiments, this description is not intended to be construed in a limiting sense. Various modifications and combinations of the illustrative embodiments, as well as other embodiments of the present disclosure, will be apparent to persons skilled in the art upon reference to the description. It is therefore intended that the appended claims encompass any such modifications or embodiments.

What is claimed is:

1. A method, comprising:
   monitoring a signal to detect transient events at an output of a regulated power converter, wherein the transient events comprise a first transient event and a second transient event after the first transient event;
   in response to detecting the second transient event, measuring a transient event period between the first transient event and the second transient event; and
   setting a regulation control parameter, of a control engine generating a control signal to control the regulated power converter, to a value determined based upon the measured transient event period between the first transient event and the second transient event, wherein the setting the regulation control parameter comprises at least one of setting a proportional integral derivative (PID) compensator gain parameter of a PID controller of the control engine, setting an adaptive voltage positioning (AVP) droop level of an AVP controller of the control engine, setting an AVP bandwidth of an AVP filtering module of the control engine or setting an inductor current synthesis parameter of a current monitor of the control engine.

2. The method of claim 1, wherein the transient events comprise a third transient event before the first transient event, the method comprising:
   in response to detecting the first transient event, determining a second transient event period between the third transient event and the first transient event; and
   determining, based upon the transient event period and the second transient event period, a filtered transient event period, wherein the value is determined based upon the filtered transient event period.

3. The method of claim 2, wherein:
the first transient event, the second transient event and the third transient event are a first type of transient event;
the transient events comprise a fourth transient event, a fifth transient event and a sixth transient event;
the fourth transient event, the fifth transient event and the sixth transient event are a second type of transient event; and
the method comprises:
determining a third transient event period between the fourth transient event and the fifth transient event;
determining a fourth transient event period between the fifth transient event and the sixth transient event;
determining a second filtered transient event period based upon the third transient event period and the fourth transient event period;
determining a first difference between the filtered transient event period and the transient event period;
determining a second difference between the second filtered transient event period and the fourth transient event period; and
selecting the filtered transient event period, from among the filtered transient event period and the second filtered transient event period, based upon a determination that the first difference is smaller than the second difference, wherein the value is determined based upon the filtered transient event period in response to the selecting the filtered transient event period.

4. The method of claim 3, wherein:
the first type of transient event corresponds to under-voltage events at the output of the regulated power converter and the second type of transient event corresponds to over-voltage events at the output of the regulated power converter; or
the first type of transient event corresponds to over-voltage events at the output of the regulated power converter and the second type of transient event corresponds to under-voltage events at the output of the regulated power converter.

5. The method of claim 1, wherein:
the signal is indicative of a voltage error corresponding to a difference between a target voltage of the regulated power converter and an output voltage of the regulated power converter; and
the transient events comprise at least one of:
under-voltage events at the output of the regulated power converter, wherein an under-voltage event of the under-voltage events corresponds to the voltage error crossing a first threshold voltage error; or
over-voltage events at the output of the regulated power converter, wherein an over-voltage event of the over-voltage events corresponds to the voltage error crossing a second threshold voltage error.

6. The method of claim 5, comprising:
modifying at least one of the first threshold voltage error or the second threshold voltage error based upon the transient event period.

7. The method of claim 1, wherein:
the determining the transient event period comprises:
starting a counter in response to detecting the first transient event; and
in response to detecting the second transient event, determining the transient event period based upon a counter value of the counter.

8. The method of claim 1, wherein:
the setting the regulation control parameter comprises setting the PID compensator gain parameter of the PID controller of the control engine.

9. The method of claim 1, wherein:
the setting the regulation control parameter comprises setting the AVP droop level of the AVP controller of the control engine.

10. The method of claim 1, wherein:
the setting the regulation control parameter comprises setting the AVP bandwidth of the AVP filtering module of the control engine.

11. The method of claim 1, wherein:
the setting the regulation control parameter comprises setting the inductor current synthesis parameter of the current monitor of the control engine.

12. An apparatus comprising:
a regulated power converter;
a control engine configured to generate a control signal to control the regulated power converter based upon a regulation control parameter;
a period detection system configured to:
monitor a signal to detect transient events at an output of the regulated power converter, wherein the transient events comprise a first transient event and a second transient event after the first transient event;
in response to the second transient event, measure a transient event period between the first transient event and the second transient event; and
determine transient event period information based upon the measured transient event period; and
a parameter control system configured to set the regulation control parameter, of the control engine generating the control signal to control the regulated power converter, to a value determined based upon the transient event period information, wherein the setting the regulation control parameter comprises at least one of setting a proportional integral derivative (PID) compensator gain parameter of a PID controller of the control engine, setting an adaptive voltage positioning (AVP) droop level of an AVP controller of the control engine, setting an AVP bandwidth of an AVP filtering module of the control engine or setting an inductor current synthesis parameter of a current monitor of the control engine.

13. The apparatus of claim 12, wherein:
the control engine is configured to output, based upon the regulation control parameter, a set of pulse width modulation (PWM) signals to the regulated power converter; and
at least one of an output voltage of the regulated power converter or an output current of the regulated power converter are based upon the set of PWM signals.

14. The apparatus of claim 13, wherein:
the control engine is a multi-phase buck control engine; and
each PWM signal of the set of PWM signals is associated with a phase of a set of phases associated with the multi-phase buck control engine.

15. The apparatus of claim 13, wherein:
the control engine is configured to output the set of PWM signals based upon:
a target voltage associated with the output of the regulated power converter; and
at least one of the output voltage or the output current.

16. The apparatus of claim 12, wherein:

the transient events comprise a third transient event before the first transient event; and the period detection system is configured to:

in response to the first transient event, determine a second transient event period between the third transient event and the first transient event; and determine, based upon the transient event period and the second transient event period, a filtered transient event period, wherein the transient event period information is based upon the filtered transient event period.

17. The apparatus of claim 16, wherein:

the first transient event, the second transient event and the third transient event are a first type of transient event;

the transient events comprise a fourth transient event, a fifth transient event and a sixth transient event;

the fourth transient event, the fifth transient event and the sixth transient event are a second type of transient event; and the period detection system is configured to:

determine a third transient event period between the fourth transient event and the fifth transient event;

determine a fourth transient event period between the fifth transient event and the sixth transient event;

determine a second filtered transient event period based upon the third transient event period and the fourth transient event period;

determine a first difference between the filtered transient event period and the transient event period;

determine a second difference between the second filtered transient event period and the fourth transient event period; and select the filtered transient event period, from among the filtered transient event period and the second filtered transient event period, for use in determining the transient event period information, based upon a determination that the first difference is smaller than the second difference.

18. The apparatus of claim 17, wherein:

the first type of transient event corresponds to under-voltage events at the output of the regulated power converter and the second type of transient event corresponds to over-voltage events at the output of the regulated power converter; or the first type of transient event corresponds to over-voltage events at the output of the regulated power converter and the second type of transient event corresponds to under-voltage events at the output of the regulated power converter.

19. The apparatus of claim 12, wherein:

the signal is indicative of a voltage error corresponding to a difference between a target voltage of the regulated power converter and an output voltage of the regulated power converter; and the transient events comprise at least one of:

under-voltage events at the output of the regulated power converter, wherein an under-voltage event of the under-voltage events corresponds to the voltage error crossing a first threshold voltage error; or over-voltage events at the output of the regulated power converter, wherein an over-voltage event of the over-voltage events corresponds to the voltage error crossing a second threshold voltage error.

20. The apparatus of claim 12, wherein:

the period detection system comprises a counter; and the period detection system is configured to:

start the counter in response to the first transient event; and in response to the second transient event, determine the transient event period based upon a counter value of the counter.

21. An apparatus comprising:

a regulated power converter;

a control engine configured to control the regulated power converter based upon a regulation control parameter;

a period detection system configured to:

monitor a signal to detect transient events at an output of the regulated power converter, wherein the transient events comprise a first transient event, a second transient event after the first transient event and a third transient event after the second transient event;

in response to the second transient event, determine a transient event period between the first transient event and the second transient event;

in response to the third transient event, determine a second transient event period between the second transient event and the third transient event;

determine, based upon the transient event period and the second transient event period, a filtered transient event period; and determine transient event period information based upon the filtered transient event period; and a parameter control system configured to set the regulation control parameter to a value determined based upon the transient event period information.

22. The apparatus of claim 21, wherein:

the output of the regulated power converter is connected to a load operatively coupled to a circuit board.

* * * * *